(12) United States Patent
Ofek

(10) Patent No.: US 6,272,131 B1
(45) Date of Patent: Aug. 7, 2001

(54) INTEGRATED DATA PACKET NETWORK USING A COMMON TIME REFERENCE

(75) Inventor: Yoram Ofek, Riverdale, NY (US)

(73) Assignee: Synchrodyne Networks, Inc.

( * ) Notice: Subject to any disclaimer, the term of this patent is extended or adjusted under 35 U.S.C. 154(b) by 0 days.

(21) Appl. No.: 09/120,636

(22) Filed: Jul. 22, 1998

Related U.S. Application Data

(60) Provisional application No. 60/088,983, filed on Jun. 11, 1998.

(51) Int. Cl.⁷ .................................................. H04L 12/28
(52) U.S. Cl. .............................................. 370/389; 370/517
(58) Field of Search ................... 370/389, 391, 370/392, 241, 252, 253, 351, 356, 357, 464, 465, 503, 504, 517, 395, 396, 353, 508, 509, 516, 518

(56) References Cited

U.S. PATENT DOCUMENTS

| | | | |
|---|---|---|---|
| 4,821,259 | 4/1989 | DeBruler et al. | 370/60 |
| 5,050,161 | * 9/1991 | Golestani | 370/230 |
| 5,418,779 | 5/1995 | Yemini et al. | 370/54 |
| 5,442,636 | 8/1995 | Bontekoe | 370/108 |
| 5,455,701 | 10/1995 | Eng et al. | 359/135 |
| 5,623,483 | 4/1997 | Agrawal et al. | 370/253 |
| 5,870,562 | * 2/1999 | Butman | 709/238 |
| 5,896,388 | * 4/1999 | Earnest | 370/395 |
| 6,205,151 | * 3/2001 | Quay | 370/416 |

OTHER PUBLICATIONS

Ballart et al., "SONET: Now It's The Standard Optical Network", *IEEE Communications Magazine,* vol. 29, No. 3, Mar. 1989, pp. 8–15.

Boyle et al., "The COPS (Common Open Policy Service) Protocol", Internet Draft. <draft–ietf–rapcops–01.txt>. Mar. 1998.

R. Braden, "Resource ReSerVation Protocol (RSVP)—Version 1 Functional Specification", *IETF Request for Comment RFC2205,* Sep. 1997.

P.Dana, "Global Positioning System (GPS) Time Dissemination for Real–Time Applications", *Real Time Systems,* Kluwer Academic Publishers, Boston, 1997, pp 9–40.

M. Decina, "TMN Today: Challenges and Opportunities", *Telecommunications Network Management Into The 21st Century,* IEEE Press, New York, 1994, pp. xv–xvii.

S. Deering, "Multicast Routing In Datagram Internetwork", Ph.D. Thesis, Stanford University, Dec. 1991, pp. 1–36.

S. Deering, "Host Extensions For IP Multicasting", *IETF Request for Comment RFC1112,* Aug. 1989.

Demers et al., "Analysis and Simulation Of A Fair Queuing Algorithm", *ACM Computer Communication Review (SIG-COMM'89),* pp 1–12, 1989.

(List continued on next page.)

*Primary Examiner*—Douglas Olms
*Assistant Examiner*—Ricardo M. Pizarro
(74) *Attorney, Agent, or Firm*—Sitrick & Sitrick

(57) ABSTRACT

The invention describes a method for transmitting and forwarding packets from source nodes with variable bit rates (VBR) and how it can be integrated with other types of traffic, over a packet switching network. The sources can generate traffic with predefined average and peak rates. Packets enter the network in predefined time interval and are forwarded over each link inside the network within a periodic time interval if there is sufficient capacity. When arriving packets exceed predefined average capacity, packets are rescheduled for alternative time intervals or discarded. This invention facilitates congestion-free forwarding from one input port to multiple output ports, and consequently, from one source to multiplicity of destinations for packets within the predefined average rate. Such packets that are destined to multiple destinations reach all of their destinations in redefined time intervals and with delay jitter that is no larger than one time interval. All other packets are provided with statistical guarantees.

68 Claims, 24 Drawing Sheets

OTHER PUBLICATIONS

T.Earnest, "GPS Times Isochronous ATM Cells", *Electronic Engineering Times*, Feb. 13, 1995, p. 54.

Ferrari et al., "A Scheme For Real–Time Channel Establishment In Wide–Area Networks", *IEEE Journal on Selected Areas in Communication*, vol. 8, No. 3, Apr. 1990, pp. 368–379.

S.J. Golestani, "Congestion–Free Communication In High–Speed Packet Networks", *IEEE Transactions on Communications*, vol. 39, No. 12, Dec. 1991, pp. 1802–1812.

Handley et. al, "SIP–Session Initiation Protocol", <draft–draft–ietf–mmusic–sip–04.ps>, Nov. 1997.

Händel et al., "Signalling", *ATM Networks: Concepts, Protocols, and Applications*, (2nd Ed.) Addison–Wesley Publishing Co., 1994, Chapter 6, pp. 141–158.

Hennessy et al., "Enhancing Performance with Pipelining", *Computer Organization & Design: The Hardware/Software Interface*, Morgan Kaufman Publishers, San Mateo, CA, 1994, Chapter 6, pp. 364–389.

C. Huitema, "Why is RIP So Simple?", *Routing In The Internet*, Prentice Hall, 1995, chapter 4, pp. 65–98.

IEEE 802.9a Editor. Integrated service (is): IEEE 802.9a "Isochronous Services With CSMA/CD MAC Service", IEEE Draft, Mar. 1995.

ITU–T, "Visual Telephone Systems and Equipment For Local Area Networks Which Provide A Non–Guaranteed Quality Of Service", ITU–T Recommendation H.323, 1996.

ITU–T "Line Transmission Of Non–Telephone Signals: Control Protocol For Multimedia Communication", ITU–T Recommendation H.245, 1994.

Kandlur et al., "Real Time Communication In Multi–Hop Networks", *IEEE Transactions On Parallel and Distributed Systems*, vol. 5, No. 10, Oct. 1991, pp. 10441055.–.

M.G.H. Katevenis, "Fast Switching And Fair Control Of Congested Flow In Broadband Networks", *IEEE Journal on Selected Areas in Communications*, vol. SAC–5, No. 8, Oct. 1987, pp. 1315–1326.

J. Levine, "An Algorithm to Synchronize the Time of a Computer to Universal Time", *IEEE/ACM Transactions on Networking*, vol. 3, No. 1, Feb. 1995, pp 42–50.

Li et al., "Pseudo–Isochronous Cell Switching In ATM Networks", IEEE INFOCOM'94, pp. 428–437, 1994.

D.Mills, "Improved Algorithms for Synchronizing Computer Network Clocks", *Computer Comm. Rev. (USA)*, vol. 24, No. 4, Oct. 1994, pp 317–327.

D. Mills, "Internet Time Synchronization: The Network Time Protocol", *IEEE Transactions on Communications*, vol. 39, No. 10, Oct. 1981, pp. 1482–1493.

Y. Ofek, "The Topology, Algorithms And Analysis Of A Synchronous Optical Hypergraph Architecture", Ph.D. Dissertation, Electrical Engineering Department, University of Illinois at Urbana, Report No. UIUCDCS–R–87–1343, May 1987.

Y. Ofek, "Integration Of Voice Communication On A Synchronous Optical Hypergraph", INFOCOM'88, 1988.

Y. Ofek, "Generating A Fault Tolerant Global Clock Using High–Speed Control Signals For The MetaNet Architecture", *IEEE Transactions on Communications*, pp. 2179–2188, May 1994.

Y.Ofek, "The Conservation Code for Bit Synchronization", *IEEE Transactions on Communications*, vol. 38, No. 7, Jul. 1990, pp. 1107–1113.

Ofek et al., "'Time–Driven Priority' Flow Control For Real–Time Heterogeneous Internetworking", IEEE INFOCOM'96, 1996.

Parekh et al., "A Generalized Processor Sharing Approach To Flow Control In Integrated Services Networks: The Multiple Node Case", *IEEE Transactions on Networking*, vol. 2, No. 2, Apr. 1994, pp. 137–150.

Patterson et al., "Pipelining", *Computer Architecture: A Quantitative Approach*, Morgan Kaufman Publishers, San Mateo, CA, 1990, Chapter 6, pp. 251–278.

T. Piotrowski, "Synchronization Of Telecommunication Network Using A Global Positioning Satellite", Abstract, IEEE PLANS'92, Mar. 1992.

D.Robinson, "Internet Stratum One GPS Network Time Server: A Commercial Embodiment", Datum Corporation.

Rosen et al., "A Proposed Architecture For MPLS" <draft–ietf–mpls–arch–00.txt> Internet Draft, Aug. 1997.

Schultzrinne et. al, "RTP: A Transport Protocol for Real–Time Applications, IETF Request for Comment RFC1889", Jan. 1996.

M. Schwartz, "Networking Layer: Routing Function", *Telecommunication Networks: Protocols, Modeling, and Analysis*, Addison Wesley, Reading MA, 1987, Chapter 6, pp. 259–330.

Shenker et al., "Specification of Guaranteed Quality of Service, IETF Request for Comment RFC2212", Sep. 1997.

W. Stallings, "Overview", *SNMP, SNMPy2, and CMIP: The Practical Guide To Network Management*, Addison Wesley, 1993, Chapter 1, pp. 1–14.

A.Tannebaum, "Routing Algorithms", *Computer Networks*, (3rd Ed) Prentice Hall, 1996, Chapter 5.2, pp. 345–374.

C. Topolcic (Ed.) Experimental Internet Stream Protocol, Version 2 (ST–II), RFC 1190, Oct. 1990.

J. Wroclawski, "Specification of the Controlled–Load Network Element Service", IETF RFC 2211, Sep. 1997.

D. Mills, "Network Time Protocol (Version 3) Specification, Implementation and Analysis", Network Working Group, RFC 1305, University of Delaware, Mar. 1992.

S.J.Golestani, "A Framing Strategy for Congestion Management", *IEEE Journal on Selected Areas in Communications*, vol. 9, No. 7, Sep. 1991, pp. 1064–1077.

Li et al., "Pseudo–isonchronous Cell Forwarding", *Computer Networks and ISDN Systems*, vol. 30 (1998), pp. 2359–2372.

Li et al., "Time–driven Priority Flow Control for Real–time Heterogeneous Internetworking", *Proceedings of Infocom*, vol. 15, Los Alamitos, CA, Mar. 1996, pp. 189–197.

\* cited by examiner

4B/5B encoding scheme

| HEX DATA | 4-bit Binary Data | 5-bit Encoded Data Codeword |
|---|---|---|
| 0 | 0000 | 11110 |
| 1 | 0001 | 01001 |
| 2 | 0010 | 10100 |
| 3 | 0011 | 10101 |
| 4 | 0100 | 01010 |
| 5 | 0101 | 01011 |
| 6 | 0110 | 01110 |
| 7 | 0111 | 01111 |
| 8 | 1000 | 10010 |
| 9 | 1001 | 10011 |
| A | 1010 | 10110 |
| B | 1011 | 10111 |
| C | 1100 | 11010 |
| D | 1101 | 11011 |
| E | 1110 | 11100 |
| F | 1111 | 11101 |

FIG. 10

4B/5B encoding scheme

| HEX DATA | Control Input Binary Data | 10-bit Encoded Control Codeword |
|---|---|---|
| 1 | 0001 | 11111 11111 |
| 2 | 0010 | 01101 01101 |
| 3 | 0011 | 01101 11001 |
| 4 | 0100 | 11111 00100 |
| 5 | 0101 | 01101 00111 |
| 6 | 0110 | 11001 00111 |
| 7 | 0111 | 11001 11001 |
| 8 | 1000 | 00100 00100 |
| 9 | 1001 | 00100 11111 |
| A | 1010 | 00100 00000 |
| B | 1011 | 00111 00111 |
| C | 1100 | 00111 11001 |
| D | 1101 | 00000 00100 |
| E | 1110 | 00000 11111 |
| F | 1111 | 00000 00000 |

| P1/P2 | |
|---|---|
| 00 | CBR – constant bit rate |
| 01 | VBR – variable bit rate |
| 10 | "Best Effort" |
| 11 | Rescheduled data packet |

Fig. 19

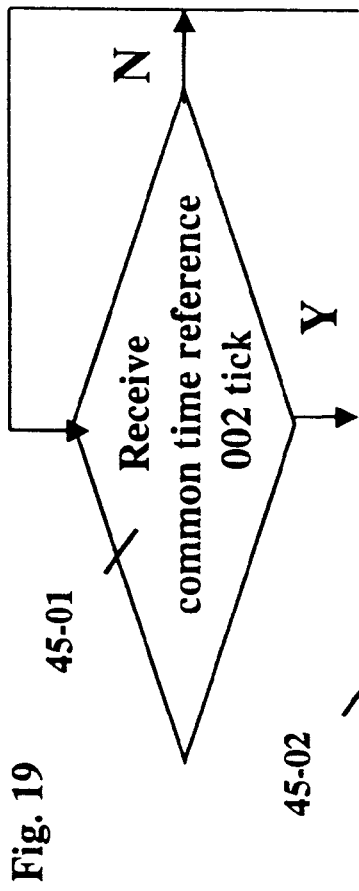

- Send time-frame delimiter control signal 47A to the serial transmitter.
- If it is an odd tick 002, while using 46A and 46B select signals:
  1) switch incoming packets 51 to buffer Ba via link 51-1:
     use P1,P2 in the header in order to determine in what part, CBR/VBR/Best effort, of the buffer to store the data packet, and
  2) forward to the serial transmitter packets from buffer Bb, first all CBR packets then VBR packets, via link 46-2, and then best effort packets from B-E;
- Else (even tick) 002, while using 46A and 46B select signals:
  1) switch incoming packets 51 to buffer Bb via link 51-2:
     use P1/P2 in the header in order to determine in what part, CBR/VBR/Best effort, of the buffer to store the data packet, and
  2) forward to the serial transmitter packets from buffer Ba, first all CBR packets then VBR packets, via link 46-1, and then best effort packets from B-E.

- Real-time protocol (RTP) with the following fields in the header:
  - version (V) - 2 bits
  - padding (P) - 1 bit
  - extension (X) - 1 bit
  - CSRC count (CC) - 4 bits
  - marker (M) - 1 bit
  - payload type - 7 bits
  - sequence number - 16 bits
  - times-tamp - 32 bits

INTEGRATED DATA PACKET NETWORK USING A COMMON TIME REFERENCE

RELATED APPLICATIONS

This application is a continuation of provisional application Ser. No. 60/088,983 filed Jun. 11, 1998.

BACKGROUND OF THE INVENTION

This invention relates generally to a method and apparatus for integrating the transfer of two traffic types over a data packet communications network. More specifically, this invention provides timely forwarding and delivery of data packets from sources with constant bit rate (CBR) and variable bit rate (VBR) over the network and to their destination nodes. Consequently, the end-to-end performance parameters, such as, loss, delay and jitter, have either deterministic or probabilistic guarantees.

The proliferation of high-speed communications links, fast processors, and affordable, multimedia-ready personal computers brings about the need for wide area networks that can carry real time data, like telephony and video. However, the end-to-end transport requirements of real-time multimedia applications present a major challenge that cannot be solved satisfactorily by current networking technologies. Such applications as video teleconferencing, and audio and video multicasting generate data at a wide range of bit rates and require predictable, stable performance and strict limits on loss rates, average delay, and delay variations ("jitter"). These characteristics and performance requirements are incompatible with the services that current circuit and packet switching networks can offer.

Circuit-switching networks, which are still the main carrier for real-time traffic, are designed for telephony service and cannot be easily enhanced to support multiple services or carry multimedia traffic. Its synchronous byte switching enables circuit-switching networks to transport data streams at constant rates with little delay or jitter. However, since circuit-switching networks allocate resources exclusively for individual connections, they suffer from low utilization under bursty traffic. Moreover, it is difficult to dynamically allocate circuits of widely different capacities, which makes it a challenge to support multimedia traffic. Finally, the synchronous byte switching of SONET, which embodies the Synchronous Digital Hierarchy (SDH), requires increasingly more precise clock synchronization as the lines speed increases [Ballart et al., "SONET: Now It's The Standard Optical Network", IEEE Communications Magazine, Vol. 29 No. 3, March 1989, pages 8–15] [M. Schwartz, "Telecommunication Networks: Protocols, Modeling, and Analysis", Addison Wesley, Reading Mass., 1987].

Packet switching networks like IP (Internet Protocol)-based Internet and Intranets [see, for example, A. Tannebaum, "Computer Networks" (3rd Ed) Prentice Hall, 1996] and ATM (Asynchronous Transfer Mode) [see, for example, Handel et al., "ATM Networks: Concepts, Protocols, and Applications", (2nd Ed.) Addison-Wesley, 1994] handle bursty data more efficiently than circuit switching, due to their statistical multiplexing of the packet streams. However, current packet switches and routers operate asynchronously and provide best effort service only, in which end-to-end delay and jitter are neither guaranteed nor bounded. Furthermore, statistical variations of traffic intensity often lead to congestion that results in excessive delays and loss of packets, thereby significantly reducing the fidelity of real-time streams at their points of reception. In fact, under best effort service, the performance characteristics of a given connection are not even predictable at the time of connection establishment.

Efforts to define advanced services for both IP and ATM have been conducted in two levels: (1) definition of service, and (2) specification of methods for providing different services to different packet streams. The former defines interfaces, data formats, and performance objectives. The latter specifies procedures for processing packets by hosts and switches/routers. The types of services that defined for ATM include constant bit rate (CBR), variable bit rate (VBR) and available bit rate (ABR). For IP, the defined services include guaranteed performance (bit rate, delay), controlled flow, and best effort [J. Wroclawski, "Specification of the Controlled-Load Network Element Service", IETF RFC 2211, September 1997] [Shenker et. al., "Specification of Guaranteed Quality of Service", IETF RFC 2212. September 1997]. Signaling protocols, e.g., RSVP and UNI3.1, which carry control information to facilitate the establishment of the desired services, are specified for IP and ATM, respectively [R. Braden, "Resource ReSerVation Protocol (RSVP)—Version 1 Functional Specification, IETF Request for Comment RFC2205", September 1997] [Handel et al., "ATM Networks: Concepts, Protocols, and Applications", (2nd Ed.) Addison-Wesley, 1994]. These protocols address the transport of data to one destination known as unicast or multiple destinations multicast [S. Deering, "Multicast Routing In Datagram Internet", Ph.D. Thesis, Stanford University, December 1991]. In addition, SIP, a higher level protocol for facilitating the establishment of sessions that use the underlying services, is currently under definition under IETF auspices [Handley et al., "SIP-Session Initiation Protocol", <draft-draft-ietf-mmusic-sip-04.ps>, November 1997].

The methods for providing different services under packet switching fall under the general title of Quality of Service (QoS). Prior art in QoS can be divided into two parts: (1) traffic shaping with local timing without deadline scheduling, for example [M. G. H. Katevenis, "Fast Switching And Fair Control Of Congested Flow In Broadband Networks", IEEE Journal on Selected Areas in Communications, SAC-5(8):1315–1326, October 1987; Demers et al., "Analysis and Simulation Of A Fair Queuing Algorithm", ACM Computer Communication Review (SIGCOMM'89), pages 3–12, 1989; S. J. Golestani, "Congestion-Free Communication In High-Speed Packet Networks", IEEE Transcripts on Communications, COM-39(12):1802–1812, December 1991; Parekh et al., "A Generalized Processor Sharing Approach To Flow Control—The Multiple Node Case", IEEE/ACM T. on Networking, 2(2) :137–150, 1994], and (2) traffic shaping with deadline scheduling, for example [Ferrari et al., "A Scheme For Real-Time Channel Establishment In Wide-Area Networks", IEEE Journal on Selected Areas in Communication, SAC-8(4):368–379, April 1990; Kandlur et al., "Real Tune Communication In Multi-Hop Networks", IEEE Trans. on Parallel and Distributed Systems, Vol. 5, No. 10, pp. 1044–1056, 1994]. Both of these approaches rely on manipulation of local queues by each router with little coordination with other routers. The Weighted Fair Queuing (WFQ), which typifies these approaches, is based on cyclical servicing of the output port queues where the service level of a specific class of packets is determined by the amount of time its queue is served each cycle [Demers et al., "Analysis and Simulation Of A Fair Queuing Algorithm", ACM Computer Communication Review (SIGCOMM'89), pages 3–12, 1989]. These approaches have inherent limitations when used to transport real-time streams. When traffic shaping without deadline scheduling is configured to operate at high utilization with no loss, the delay and jitter are inversely proportional to the connection bandwidth, which means that low rate connections may experience large delay and jitter inside the network. In traffic shaping with deadline scheduling the delay and jitter are controlled at the expense of possible congestion and loss.

The recognition that the processing of packets by switches and routers constitutes a performance bottleneck resulted in the development of methods for enhancing performance by simplifying the processing of packets. Multiprotocol Label Switching (MPLS) converts the destination address in the packet header into a short tag, which defines the routing of the packet inside the network [Callon et al., "A Proposed Architecture For MPLS" <draft-ietf-mpls-arch-00.txt> INTERNET DRAFT, August 1997].

The real-time transport protocol (RTP) [H. Schultzrinne et. al, RTP: A Transport Protocol for Real-Time Applications, IETF Request for Comment RFC1889, January 1996] is a method for encapsulating time-sensitive data packets and attaching to the data time related information like time stamps and packet sequence number. RTP is currently the accepted method for transporting real time streams over IP internetworks and packet audio/video telephony based on ITU-T H.323.

Synchronous methods are found mostly in circuit switching, as compared to packet switching that uses mostly asynchronous methods. However, some packet switching synchronous methods have been proposed. IsoEthernet or IEEE 802.9a [IEEE 802.9a Editor. Integrated service (is): IEEE 802.9a "Isochronous Services With CSMA/CD MAC Service", IEEE Draft, March 1995] combines CSMA/CD (IEEE 802.3), which is an asynchronous packet switching, with N-ISDN and H.320, which is circuit switching, over existing Ethernet infrastructure (10Base-T). This is a hybrid solution with two distinct switching methods: N-ISDN circuit switching and Ethernet packet switching. The two methods are separated in the time domain by time division multiplexing (TDM). The IsoEthernet TDM uses fixed allocation of bandwidth for the two methods—regardless of their utilization levels. This approach to resource partitioning results in undesirable side effect like under-utilization of the circuit switching part while the asynchronous packet switching is over loaded but cannot use the idle resources in the circuit switching part.

One approach to an optical network that uses synchronization was introduced in the synchronous optical hypergraph [Y. Ofek, "The Topology, Algorithms And Analysis Of A Synchronous Optical Hypergraph Architecture", Ph.D. Dissertation, Electrical Engineering Department, University of Illinois at Urbana, Report No. UIUCDCS-R-87-1343, May 1987], which also relates to how to integrate packet telephony using synchronization [Y. Ofek, "Integration Of Voice Communication On A Synchronous Optical Hypergraph", INFOCOM'88, 1988]. In the synchronous optical hypergraph, the forwarding is performed over hyperedges, which are passive optical stars. In [Li et al., "Pseudo-Isochronous Cell Switching In ATM Networks", IEEE INFOCOM'94, pages 428–437, 1994; Li et al., "Time-Driven Priority: Flow Control For Real-Time Heterogeneous Internetworking", IEEE INFOCOM'96, 1996] the synchronous optical hypergraph idea was applied to networks with an arbitrary topology and with point-to-point links. The two papers [Li et al., "Pseudo-Isochronous Cell Switching In ATM Networks", IEEE INFOCOM'94, pages 428–437, 1994; Li et al., "Time-Driven Priority: Flow Control For Real-Time Heterogeneous Internetworking", IEEE INFOCOM'96, 1996] provide an abstract (high level) description of what is called "RISC-like forwarding", in which a packet is forwarded, with little if any details, one hop every time frame in a manner similar to the execution of instructions in a Reduced Instruction Set Computer (RISC) machine [Patterson et al., "Computer Architecture: A Quantitative Approach", Morgan Kaufman Publishers, San Francisco, 1990]. In U.S. Pat. No. 5,455,701, Eng et al. discloses an apparatus for controlling a high-speed optical switching system with pipeline controller for switch control. In U.S. Pat. No. 5,418,779 Yemini et al. disclose a switched network architecture with common time reference. The time reference is used in order to determine the time in which multiplicity of nodes can transmit simultaneously over one predefined routing tree to one destination. At every time instance the multiplicity of nodes are transmitting to different single destination node.

SUMMARY OF THE INVENTION

The invention describes a method for transmitting and forwarding packets from source nodes with variable bit rates (VBR) over a packet switching network. The sources can generate traffic with predefined average and peak rates. Packets enter the network in predefined time interval and are forwarded over each link inside the network within a periodic time interval if there is sufficient capacity. When arriving packets exceed predefined average capacity, packets are rescheduled for alternative time intervals or discarded.

The switches of the network maintain a common time reference, which is obtained either from an external source (such as GPS—Global Positioning System) or is generated and distributed internally. The time intervals are arranged in simple periodicity and complex periodicity (like seconds and minutes of a clock).

The common time reference is used to determine in advance the periodic time intervals in which packet are forwarded by each switch on their route from source to destination. The time interval duration can be longer than the time duration required for transmitting a packet, in which case the exact position of a packet in the time interval is not predetermined. A packet that arrives to an input port is switched to an output port based on specific routing information in the packet's header (e.g., IPv4 destination address in the Internet, VCI/VPI labels in ATM).

Packets that are forwarded inside the network over the same route and in the same periodic time intervals constitute a virtual pipe and may share the same pipe-ID. Pipe-ID can be either explicit, such as a tag or a label that is generated inside the network, or implicit such as a group of IP addresses. This invention provides deterministic quality of service guarantees for packets within the predefined average rate. These packets are forwarded free of congestion and with delay jitter smaller than or equal to one time interval. All other packets are provided with statistical guarantees.

This invention facilitates congestion-free forwarding from one input port to multiple output ports, and consequently, from one source to multiplicity of destinations for packets within the predefined average rate. Such packets that are destined to multiple destinations reach all of their destinations in predefined time intervals and with delay jitter that is no larger than one time interval. All other packets are provided with statistical guarantees.

In accordance with the present invention, a method is disclosed providing virtual pipes that carry real-time traffic over packet switching networks while guaranteeing end-to-end performance. The method combines the advantages of both circuit and packet switching. It provides for allocation for the exclusive use of predefined connections and for those connections it guarantees loss free transport with low delay and jitter. When predefined connections do not use their allocated resources, other non-reserved data packets can use them without affecting the performance of the predefined connections. On the Internet the non-reserved data packet traffic is called "best effort" traffic. In accordance with the present invention, the bandwidth allocated to a connection and the delay and jitter inside the network are independent MPLS can be used by the present invention to identify virtual pipes. The packet time-stamp that is carried in the RTP) [H. Schultzrinne et. al, RTP: A Transport Protocol for Real-Time Applications, IETF Request for Comment RFC1889, January 1996] header can be used in accordance with the present invention to facilitate time-based transport.

Under the aforementioned prior art methods for providing packet switching services, switches and routers operate asynchronously. The present invention provides real-time services by synchronous methods that utilize a time reference that is common to the switches and end stations comprising a wide area network. The common time reference can be realized by using UTC (Coordinated Universal Time), which is globally available via, for example, GPS (Global Positioning System—see, for example: http://www.utexas.edu/depts/grg/gcraft/notes/gps/gps.html). By international agreement, UTC is the same all over the world. UTC is the scientific name for what is commonly called GMT (Greenwich Mean Time), the time at the 0 (root) line of longitude at Greenwich, England. In 1967, an international agreement established the length of a second as the duration of 9,192,631,770 oscillations of the cesium atom. The adoption of the atomic second led to the coordination of clocks around the world and the establishment of UTC in 1972. The Time and Frequency Division of the National Institute of Standards and Technologies (NIST) (see http:\\www.boulder.nist.gov/timefreq) is responsible for coordinating with the International Bureau of Weights and Measures (BIPM) in Paris in maintaining UTC.

UTC timing is readily available to individual PCs through GPS cards. For example, TrueTime, Inc.'s (Santa Rosa, Calif.) PCI-SG provides precise time, with zero latency, to computers that have PCI extension slots. Another way by which UTC can be provided over a network is by using the Network Time Protocol (NTP) [D. Mills, "Network Time Protocol" (version 3) IETF RFC 1305]. However, the clock accuracy of NTP is not adequate for interswitch coordination, on which this invention is based.

In accordance with the present invention, the use of reserved resources is allowed by all packet traffic whenever the reserved resources are not in use.

A key difference between the synchronous optical hypergraph and the present invention is the forwarding of packets over simple point-to-point edges in this invention. The pipeline in accordance with the present invention is used for the forwarding of packets inside the network, not for switch control as in the Eng et al. patent.

Although the present invention relies on time to control the flow of packets inside the network in a similar fashion as in circuit switching, there are major differences between the two approaches. In circuit switching, for each data unit (e.g., a byte) at the time it has been transmitted from its source, it is possible to predict deterministically the future times it will be transmitted from any switch along its route [Ballart et al., "SONET: Now It's The Standard Optical Network", IEEE Communications Magazine, Vol. 29 No. 3, March 1989, pages 8–15]. The time resolution of this advanced knowledge is much shorter than the data unit transmission time. On the other hand, in accordance with the present invention, for each data unit (e.g., a cell) at the time it has been transmitted from its source, it is possible to know the future time frames that this data unit will be forwarded along its route. However, the time frame, which constitutes the accuracy of this advance timing knowledge, is much larger than one data unit transmission time. For example, the transmission time of an ATM cell (53 bytes) over a gigabit per second link is 424 nanoseconds, which is 294 times smaller than a typical time frame of 125 microseconds—used in one embodiment of the present invention. There are several consequences that further distinguish the present invention from circuit switching:

In accordance with the present invention, the synchronization requirements are independent of the physical link transmission speed, while in circuit switching the synchronization becomes more and more difficult as the link speed increases.

In accordance with the present invention, timing information is not used for routing, and therefore, in the Internet, for example, the routing is done using IP addresses or a tag/label.

In accordance with the present invention, the Internet "best effort" packet forwarding strategy can be integrated into the system.

These and other aspects and attributes of the present invention will be discussed with reference to the following drawings and accompanying specification.

BRIEF DESCRIPTION OF THE DRAWINGS

FIG. 10 is a table of the 4B/5B encoding scheme for data—used by the AM7968TAXI chip set;

FIG. 11 is a table of the 4B/5B encoding scheme for control signals, such as, the time frame delimiter (TFD)—used by the AM7968;

FIG. 15 is a table classifying the data packets;

FIG. 19 is a description of the double-buffer scheduling and congestion controller 46 operation;

DETAILED DESCRIPTION OF THE PREFERRED EMBODIMENTS

Figure 1:
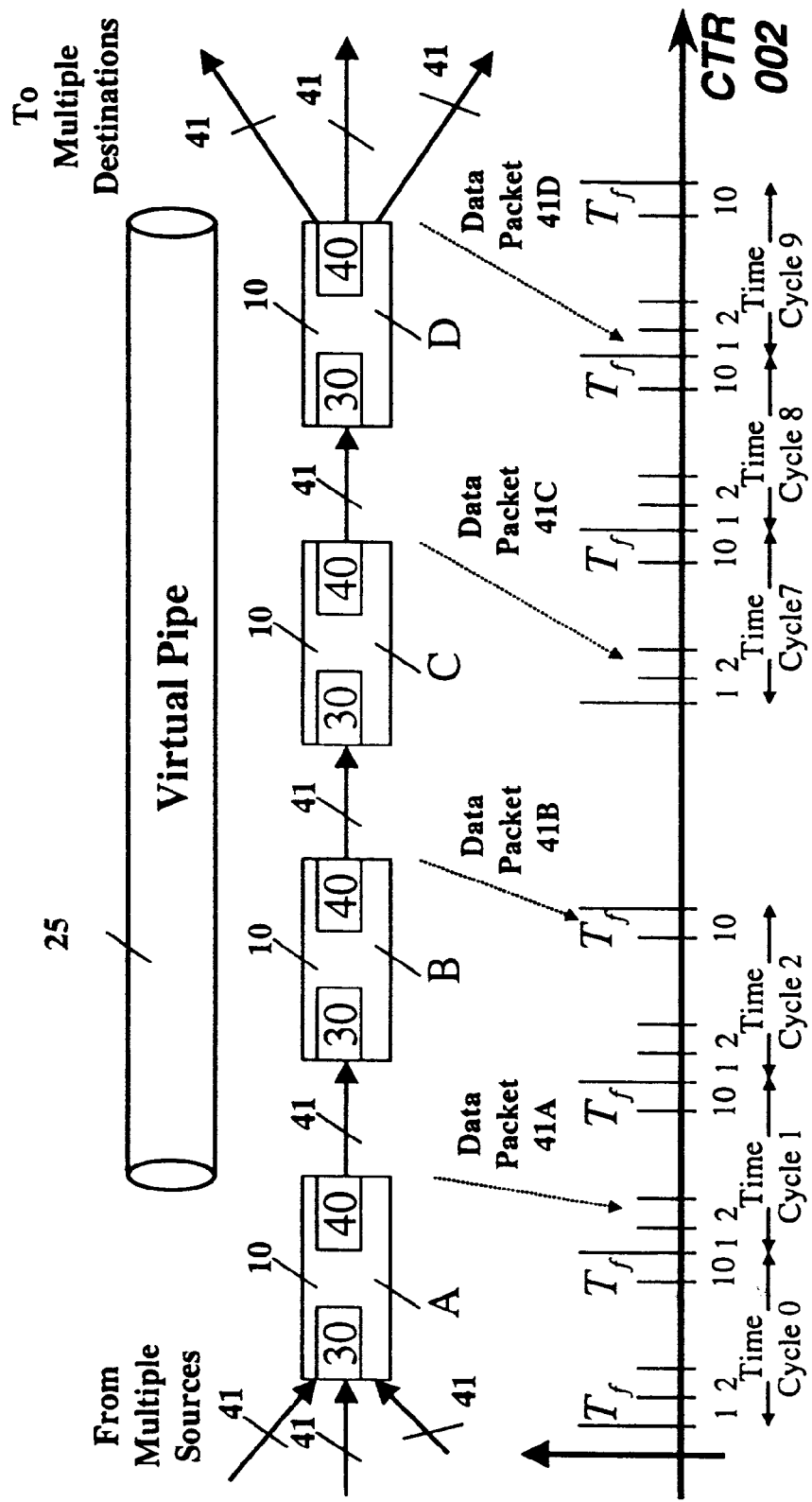
FIG. 1 is a schematic illustration of a virtual pipe and its timing relationship with a common time reference (CTR). Delay is determined by the number of time frames between the forward time out at Node A and the forward time out at Node D.

While this invention is susceptible of embodiment in many different forms, there is shown in the drawing, and will be described herein in detail, specific embodiments thereof with the understanding that the present disclosure is to be considered as an exemplification of the principles of the invention and is not intended to limit the invention to the specific embodiments illustrated.

The present invention relates to a system and method for transmitting and forwarding packets over a packet switching network. The switches of the network maintain a common time reference, which is obtained either from an external source (such as GPS—Global Positioning System) or is generated and distributed internally. The time intervals are arranged in simple periodicity and complex periodicity (like seconds and minutes of a clock). A packet that arrives to an input port of a switch, is switched to an output port based on specific routing information in the packet's header (e.g., IPv4 destination address in the Internet, VCI/VPI labels in ATM). Each switch along a route from a source to a destination forwards packets in periodic time intervals that are predefined using the common time reference. The time interval duration can be longer than the time duration required for transmitting a packet, in which case the exact position of a packet in the time interval is not predetermined.

Packets that are forwarded inside the network over the same route and in the same periodic time intervals constitute a virtual pipe and share the same pipe-ID. Pipe-ID can be either explicit, such as a tag or a label that is generated inside the network, or implicit such as a group of IP addresses. A virtual pipe can be used to transport data packets from multiple sources and to multiple destinations. A virtual pipe provides deterministic quality of service guarantees. The time interval in which a switch forwards a specific packet is determined by the packet's pipe-ID, the time it reaches the switch, and the current value of the common time reference. In accordance with the present invention, congestion-free packet switching is provided for pipe-IDs in which capacity in their corresponding forwarding links and time intervals is reserved in advance. Furthermore, packets that are transferred over a virtual pipe reach their destination in predefined time intervals, which guarantees that the delay jitter is smaller than or equal to one time interval.

Packets that are forwarded from one source to multiple destinations share the same pipe ID and the links and time intervals on which they are forwarded comprise a virtual tree. This facilitates congestion-free forwarding from one input port to multiple output ports, and consequently, from one source to multiplicity of destinations. Packets that are destined to multiple destinations reach all of their destinations in predefined time intervals and with delay jitter that is no larger than one time interval.

A system is provided for managing data transfer of data packets from a source to a destination. The transfer of the data packets is provided during a predefined time interval, comprised of a plurality of predefined time frames. The system is further comprised of a plurality of switches. A virtual pipe is comprised of at least two of the switches interconnected via communication links in a path. A common time reference signal is coupled to each of the switches, and a time assignment controller assigns selected predefined time frames for transfer into and out from each of the respective switches responsive to the common time reference signal. For each switch, there is a first predefined time frame within which a respective data packet is transferred into the respective switch, and a second predefined time frame within which the respective data packet is forwarded out of the respective switch. The time assignment provides consistent fixed intervals between the time between the input to and output from the virtual pipe.

In a preferred embodiment, there is a predefined subset of the predefined time frames during which the data packets are transferred in the switch, and for each of the respective switches, there are a predefined subset of the predefined time frames during which the data packets are transferred out of the switch.

Each of the switches is comprised of one or a plurality of addressable input and output ports. A routing controller maps each of the data packets that arrives at each one of the input ports of the respective switch to a respective one or more of the output ports of the respective switch.

For each of the data packets, there is an associated time of arrival to a respective one of the input ports. The time of arrival is associated with a particular one of the predefined time frames. For each of the mappings by the routing controller, there is an associated mapping by a scheduling controller, which maps of each of the data packets between the time of arrival and forwarding time out. The forwarding time out is associated with a specified predefined time frame.

In the preferred embodiment, there are a plurality of the virtual pipes comprised of at least two of the switches interconnected via communication links in a path. The communication link is a connection between two adjacent switches; and each of the communications links can be used simultaneously by at least two of the virtual pipes. Multiple data packets can be transferred utilizing at least two of the virtual pipes.

There is a fixed time difference, which is constant for all switches, between the time frames for the associated time of arrival and forwarding time out for each of the data packets. The fixed time difference is a variable time difference for some of the switches. A predefined interval is comprised of a fixed number of contiguous time frames comprising a time cycle. Data packets that are forwarded over a given virtual pipe are forwarded from an output port within a predefined subset of time frames in each time cycle. Furthermore, the number of data packets that can be forwarded in each of the predefined subset of time frames for a given virtual pipe is also predefined.

The time frames associated with a particular one of the switches within the virtual pipe are associated with the same switch for all the time cycles, and are also associated with one of input into or output from the particular respective switch.

There is a constant fixed time between the input into and output from a respective one of the switches for each of the time frames within each of the time cycles. A fixed number of contiguous time cycles comprise a super cycle, which is periodic. Data packets that are forwarded over a given virtual pipe are forwarded from an output port within a predefined subset of time frames in each super cycle. Furthermore, the number of data packets that can be forwarded in each of the predefined subset of time frames within a super cycle for a given virtual pipe is also predefined.

In the preferred embodiment, the common time reference signal is coupled from a GPS (Global Positioning System), and is in accordance with the UTC (Coordinated Universal Time) standard. The UTC time signal does not have to be received directly from GPS, such signal can be received by using various means, as long as the delay or time uncertainty associated with that UTC time signal does not exceed half a time frame.

In one embodiment, the super cycle duration is equal to one second as measured using the UTC (Coordinated Universal Time) standard. The super cycle can also be equal to multiple UTC seconds or a fraction of a UTC second.

A select buffer controller maps one of the time frames for output from a first switch to a second time frame for input via the communications link to a second switch. The select buffer controller uses the UTC time signal in order to identify the boundaries between two successive time frames. The select buffer controller insert a time frame delimiter (TFD) signal into the transmission link in order to the signal the second switch the exact boundary between two time frames.

Each of the data packets is encoded as a stream of data, and a time frame delimiter is inserted into the stream of data responsive to the select buffer controller. This can be implemented by using a redundant serial codewords as it is later explained.

The communication links can be of fiber optic, copper, and wireless communication links for example, between a ground station and a satellite, and between two satellites orbiting the earth. The communication link between two nodes does not have to be a serial communication link. A parallel communication link can be used—such link can carry simultaneously multiple data bits, associated clock signal, and associated control signals.

The data packets can be Internet protocol (IP) data packets, and asynchronous transfer mode (ATM) cells, and can be forwarded over the same virtual pipe having an associated pipe identification (PID). The PID can be an Internet protocol (IP) address, Internet protocol group multicast address, an asynchronous transfer mode (ATM), a virtual circuit identifier (VCI), and a virtual path identifier (VPI), or (used in combination as VCI/VPI).

The routing controller determines two possible associations of an incoming data packet: (i) the output port, and (ii) the time of arrival (TOA). The TOA is then used by the scheduling controller for determining when a data packet should be forwarded by the select buffer controller to the next switch in the virtual pipe. The routing controller utilizes at least one of Internet protocol version 4 (IPv4), Internet protocol version 6 (IPv6) addresses, Internet protocol group multicast address, Internet MPLS (multi protocol label swapping or tag switching) labels, ATM virtual circuit identifier and virtual path identifier (VCI/VPI), and IEEE 802 MAC (media access control) addresses, for mapping from an input port to an output port.

Each of the data packets is comprised of a header, which includes an associated time stamp. For each of the mappings by the routing controller, there is an associated mapping by the scheduling and rescheduling controller, of each of the data packets between the respective associated time-stamp and an associated forwarding time out, which is associated with one of the predefined time frames. The time stamp can record the time in which a packet was created by its application.

In one embodiment, the time-stamp is generated by an Internet real-time protocol (RTP), and by a predefined one of the switches. The time-stamp can be used by a scheduling controller in order to determine the forwarding time of a data packet from an output port.

Each of the data packets originates from an end station, and the time-stamp is generated at the respective end station for inclusion in the respective originated data packet. Such generation of a time-stamp can be derived from UTC either by receiving it directly from GPS or by using the Internet's Network Time Protocol (NTP).

The following description illustrates a preferred embodiment and implementation of the system disclosed in accordance with the present invention. In FIGS. 1–8, the principles of operation and implementation are presented and discussed. In FIGS. 9–24, the details of one embodiment's design are given.

In accordance with the present invention, a system is provided for transferring data packets across a data network while maintaining for reserved data traffic constant bounded jitter (or delay uncertainty) and no congestion-induced loss of data packets. Such properties are essential for many multimedia applications, such as, telephony and video teleconferencing.

Figure 2:
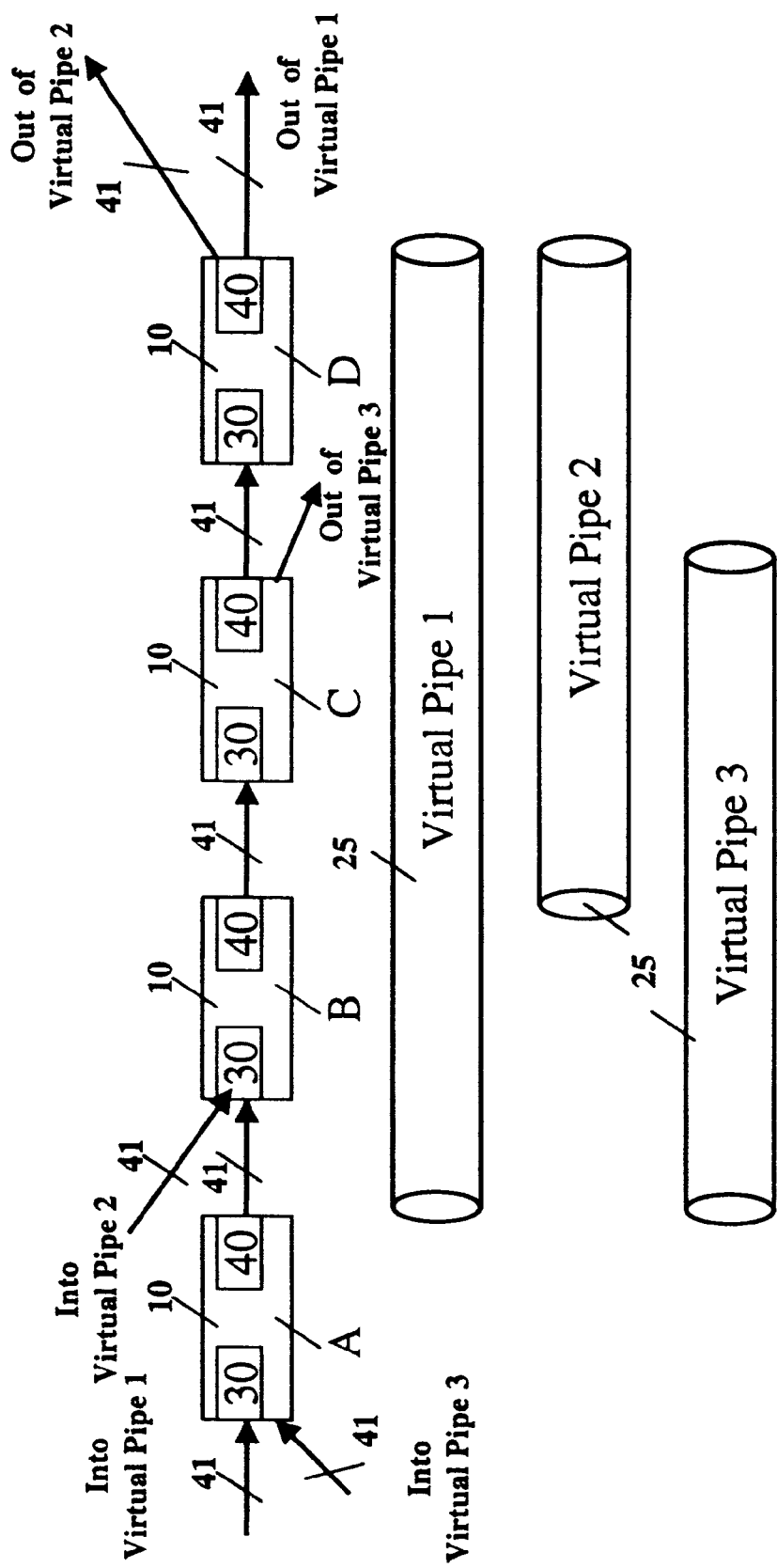
FIG. 2 is a schematic illustration of multiple virtual pipes.

In accordance with the design, method, and illustrated implementation of the present invention, one or a plurality of virtual pipes 25 are provided, as shown in FIG. 1 and FIG. 2, over a data network with general topology. Such data network can span the globe. Each virtual pipe 25 is constructed over one or more switches 10, shown in FIG. 1, which are interconnected via communication links 41 in a path.

FIG. 1 illustrates a virtual pipe 25 from the output port 40 of switch A, through switches B and C. This virtual pipe ends at the output port 40 of node D. The virtual pipe 25 transfers data packets from at least one source to at least one destination.

FIG. 2 illustrates three virtual pipes: virtual pipe 1 from the output of switch A to the output of switch D, virtual pipe 2 from the output of switch B to the output of switch D, and virtual pipe 3 from the output of switch A to the output of switch C.

The data packet transfers over the virtual pipe 25 via switches 10 are designed to occur during a plurality of predefined time intervals, wherein each of the predefined time intervals is comprised of a plurality of predefined time frames. The timely transfers of data packets are achieved by coupling a common time reference 002 (CTR) signal to each of the switches 10.

Figure 3:
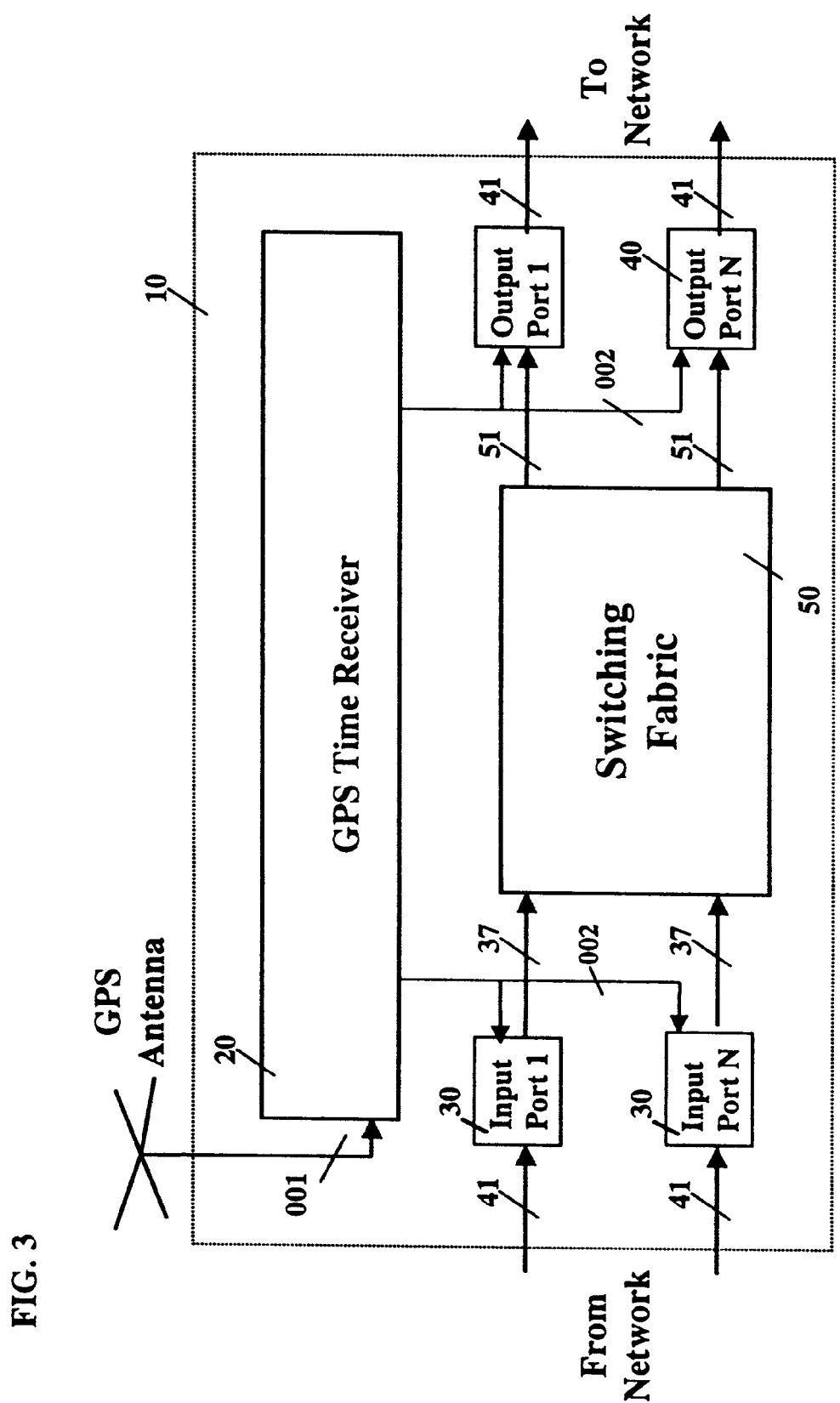
FIG. 3 is a schematic illustration of a switch that uses a common time reference from the GPS (Global Positioning System) for the timely forwarding of packets disclosed in this invention.

FIG. 3 illustrates the structure of a pipeline switch 10. The switch 10 is comprised of one or a plurality of input ports 30, one or a plurality of output ports 40, switching fabric 50, and global positioning system (GPS) time receiver 20 with a GPS antenna 001. The GPS time receiver provides a common time reference signal (CTR) 002 to all input and output ports.

The Common Time Reference (CTR) 002

Figure 4:
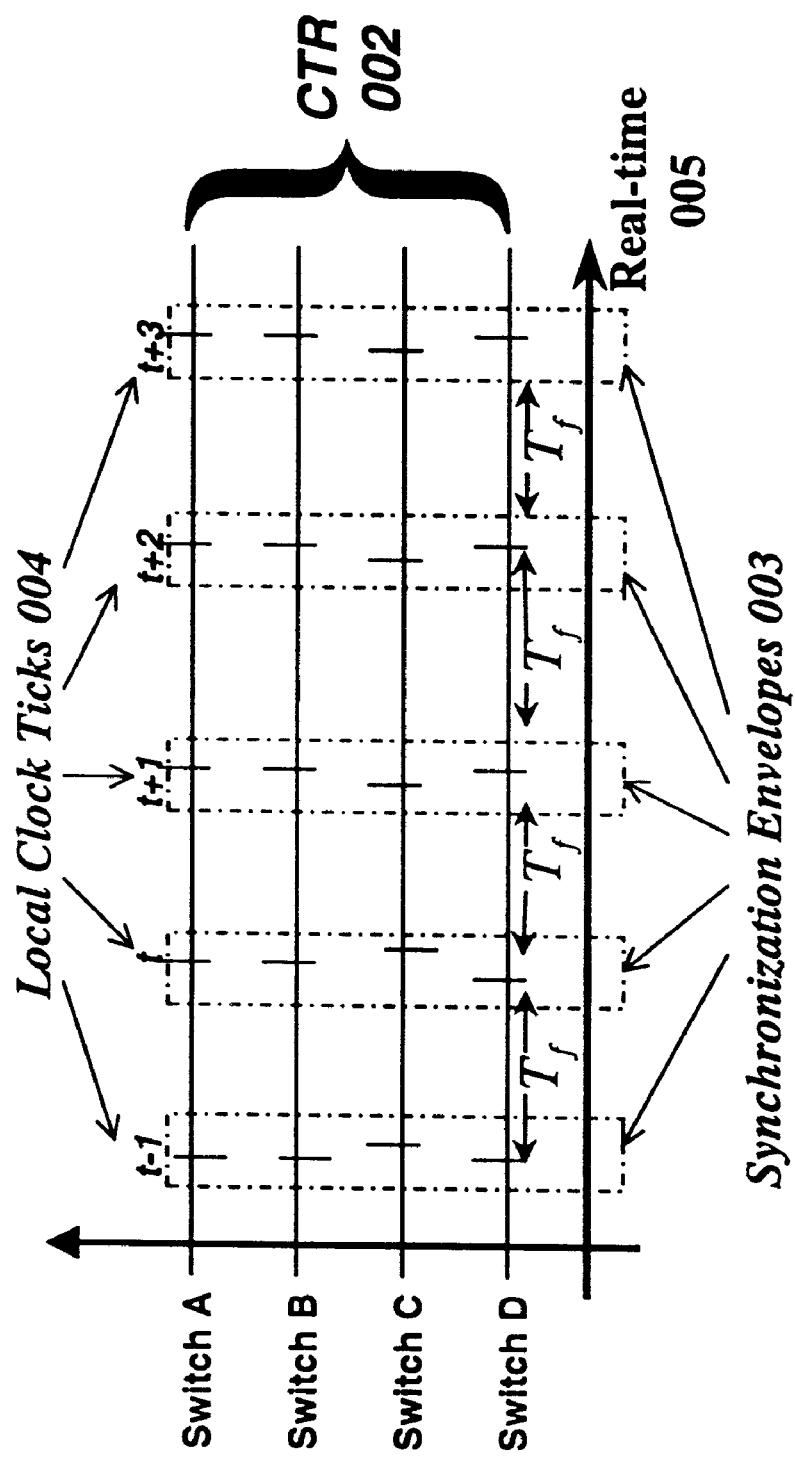
FIG. 4 is a diagram of how time is divided into time frames of a predefined duration, and the relationship among the local common time reference (CTR) on the switches, and how the multiplicity of local times is projected on the real-time axis.

As shown in FIG. 4, the common time reference 002 that is coupled to the switches 10 provides the following property: the local clock ticks 004, shown in FIG. 4, at all the pipeline switches (e.g., switches A, B, C, and D in FIGS. 1 and 2) when projected on the real-time axis 005 will all occur within predefined synchronization envelopes 003. In other words, the local clock ticks 004 occur within the synchronization envelopes 003, and therefore, outside to the synchronization envelopes all local clocks have the same clock value.

The common time reference is divided in a predefined manner into time frames, Tf, of equal duration, as shown in FIG. 4, typically Tf=125 microseconds. The time frames are grouped into time cycles. Each time cycle has predefined number of time frames.

Figure 5:
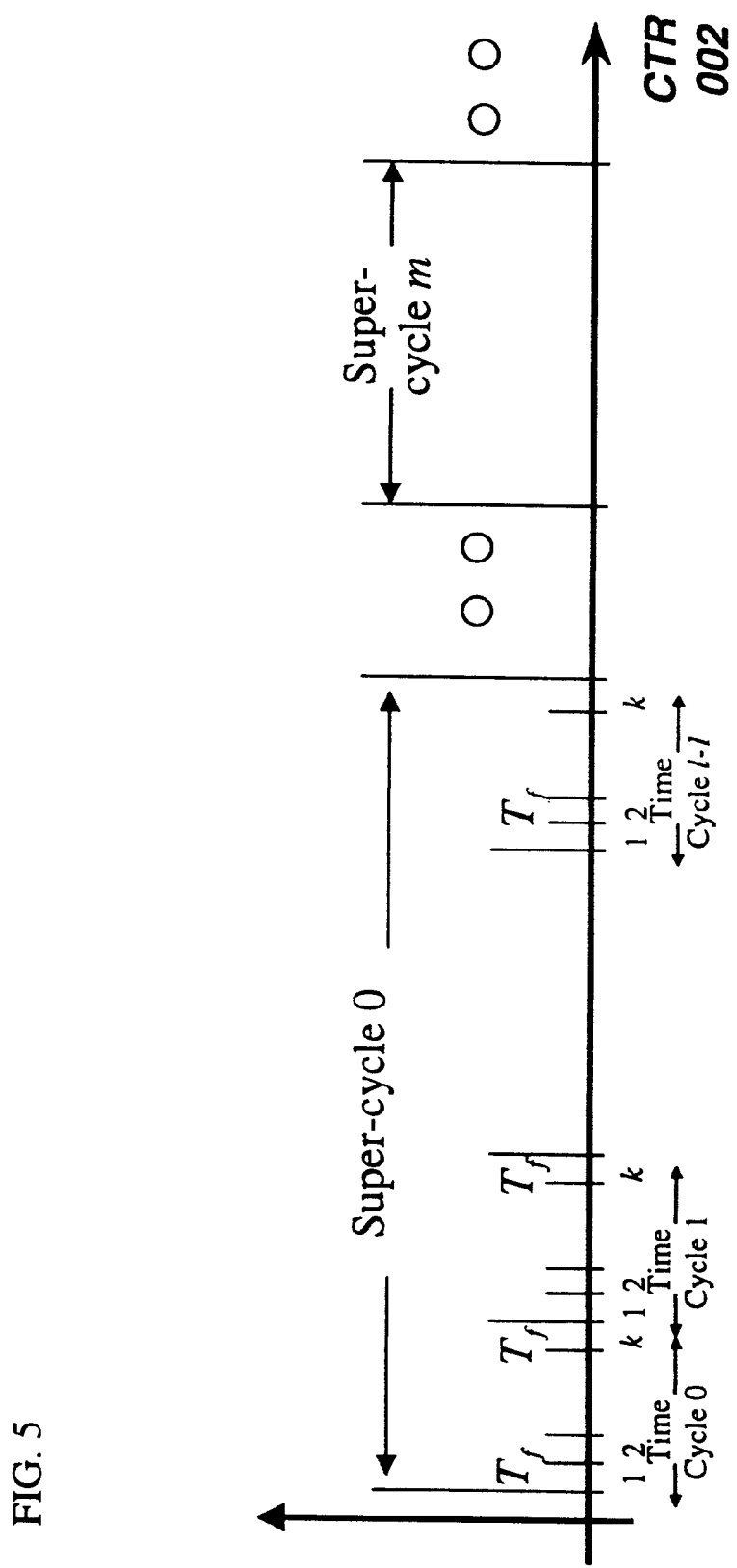
FIG. 5 is a schematic illustration of how the common time reference is organized into contiguous time-cycles of k time-frames each and contiguous super-cycle of l time-cycles each.

Referring to FIG. 5, there are k time frames in each time cycle. Contiguous time cycles are grouped together into contiguous super cycles, and as shown in FIG. 5, there are l time cycles in each super cycle.

Figure 6:
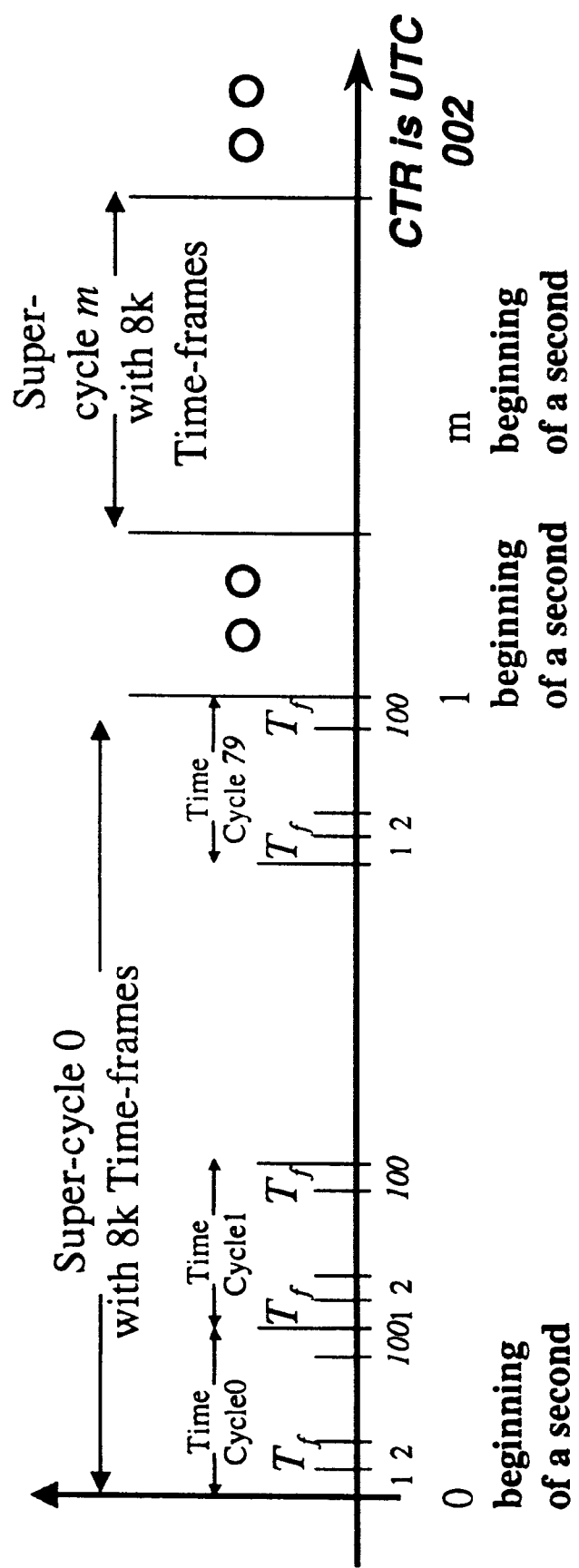
FIG. 6 is a schematic illustration of the relationship of the network common time reference and UTC (Coordinated Universal Time), such that, each time-cycle has 100 time-frames, of 125 $\mu$sec each, and 80 time-cycles are grouped into one super-cycle of one second.

FIG. 6 illustrates how the common time reference can be aligned with the UTC (Coordinated Universal Time) standard. In this illustrated example, every duration of every super cycle is exactly one second as measured by UTC. Moreover, the beginning of each super cycle coincides with the beginning of a UTC second, as shown in FIG. 6. Consequently, when leap seconds are inserted or deleted for UTC corrections (due to changes in the earth rotation period) the cycle and super cycle periodic scheduling will not be affected.

The time frames, time cycles, and super cycles are associated in the same manner with all respective switches within the virtual pipe at all times.

Pipeline Forwarding

Pipeline forwarding relates to data packets being forwarded across a virtual pipe 25 with a predefined delay in every stage (either across a communication link 41 or across a switch 10 from input port 30 to output port 40). Data packets enter a virtual pipe 25 from one or more sources and forwarded to one or more destinations.

Figure 7:
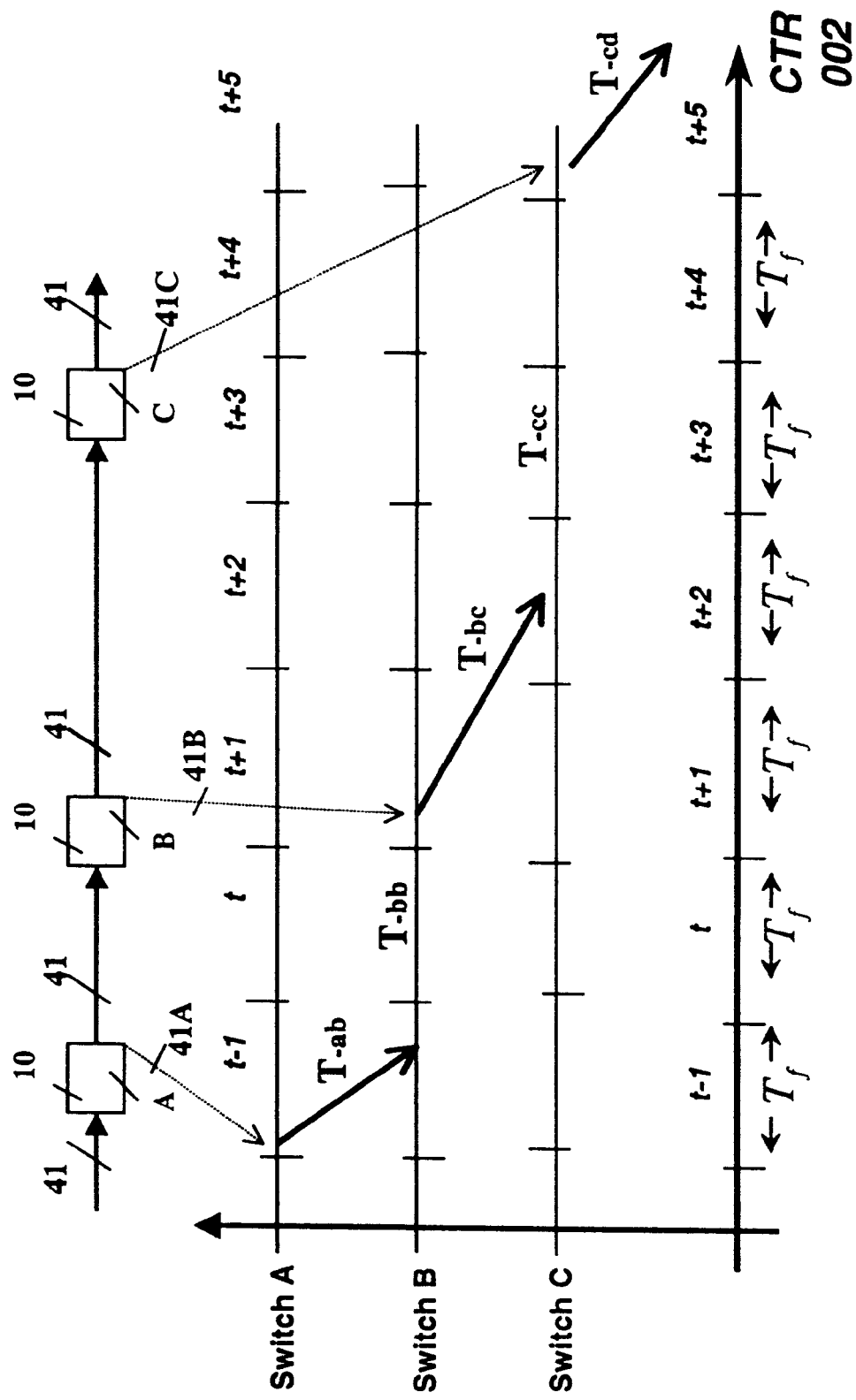
FIG. 7 is a schematic illustration of a data packet pipeline forwarding over a virtual pipe with common time reference (CTR)

This sort of pipeline forwarding used in accordance with the present invention is illustrated in FIG. 7. Data packet 41A is forwarded out of switch A during time frame t−1. This data packet 41A will reach switch B after a delay of T-ab. This data packet 41A will be forwarded out of switch B as data packet 41B during time frame t+1 and will reach switch C after a delay of T-bc. This data packet 41B will be forwarded out of switch C as data packet 41C during time frame t+5. Data packet 41C will reach switch D after a delay of T-cd. Consequently, the delay from the output of switch A to the output of switch C is 6=t+5−(t−1) time frames. As illustrated in FIG. 7, all data packets that are forwarded over that virtual pipe will have a delay of six time frames from the output of switch A to the output of switch C.

Referring again to FIG. 1, the timely pipeline forwarding of data packets over the virtual pipe 25 is illustrated. A data packet is received by one of the input ports 30 of switch A at timeframe 1, and is forwarded along this virtual pipe 25 in the following manner: (i) the data packet 41A is forwarded from the output port 40 of switch A at time frame 2 of time cycle 1, (ii) the data packet 41B is forwarded from the output port 40 of switch B, after 18 time frames, at time frame 10 of time cycle 2, (iii) the data packet 41C is forwarded from the output port 40 of switch C, after 42 time frames, at time frame 2 of time cycle 7, and (iv) the data packet 41D is forwarded from the output port 40 of switch D, after 19 time frames, at time frame 1 of time cycle 9.

As illustrated in FIG. 1,

All data packets enter the virtual pipe 25 (i.e., forwarded out of the output port 40 of switch A) periodically at the second time frame of a time cycle, are output from this virtual pipe 25 (i.e., are forwarded out of the output port 40 of switch D) after 79 time frames.

The data packets that enter the virtual pipe 25 (i.e., forwarded out of the output port 40 of switch A) can come from one or more sources and can reach switch A over one or more input links 41.

The data packets that exit the virtual pipe 25 (i.e., forwarded out of the output port 40 of switch D) can be forwarded over plurality of output links 41 to one of plurality of destinations.

The data packets that exit the virtual pipe 25 (i.e., forwarded out of the output port 40 of switch D) can be forwarded simultaneously to multiple destinations, (i.e., multicast (one-to-many) data packet forwarding).

The communication link 41 between two adjacent ones of the switches 10 can be used simultaneously by at least two of the virtual pipes.

In FIG. 2, where there are three virtual pipes:

The three virtual pipes can multiplex (i.e., mix their traffic) over the same communication links.

The three virtual pipes can multiplex (i.e., mix their traffic) during the same time frames and in an arbitrary manner.

The same time frame can be used by multiple data packets from one or more virtual pipes.

Virtual Pipe Capacity Assignment

For each virtual pipe there are predefined time frames within which respective data packets are transferred into its respective switches, and separate predefined time frames within which the respective data packets are transferred out of its respective switches. Though the time frames of each virtual pipe on each of its switches can be assigned in an arbitrary manner along the common time reference, it is convenient and practical to assign time frames in a periodic manner in time cycles and super cycles.

Figure 8:
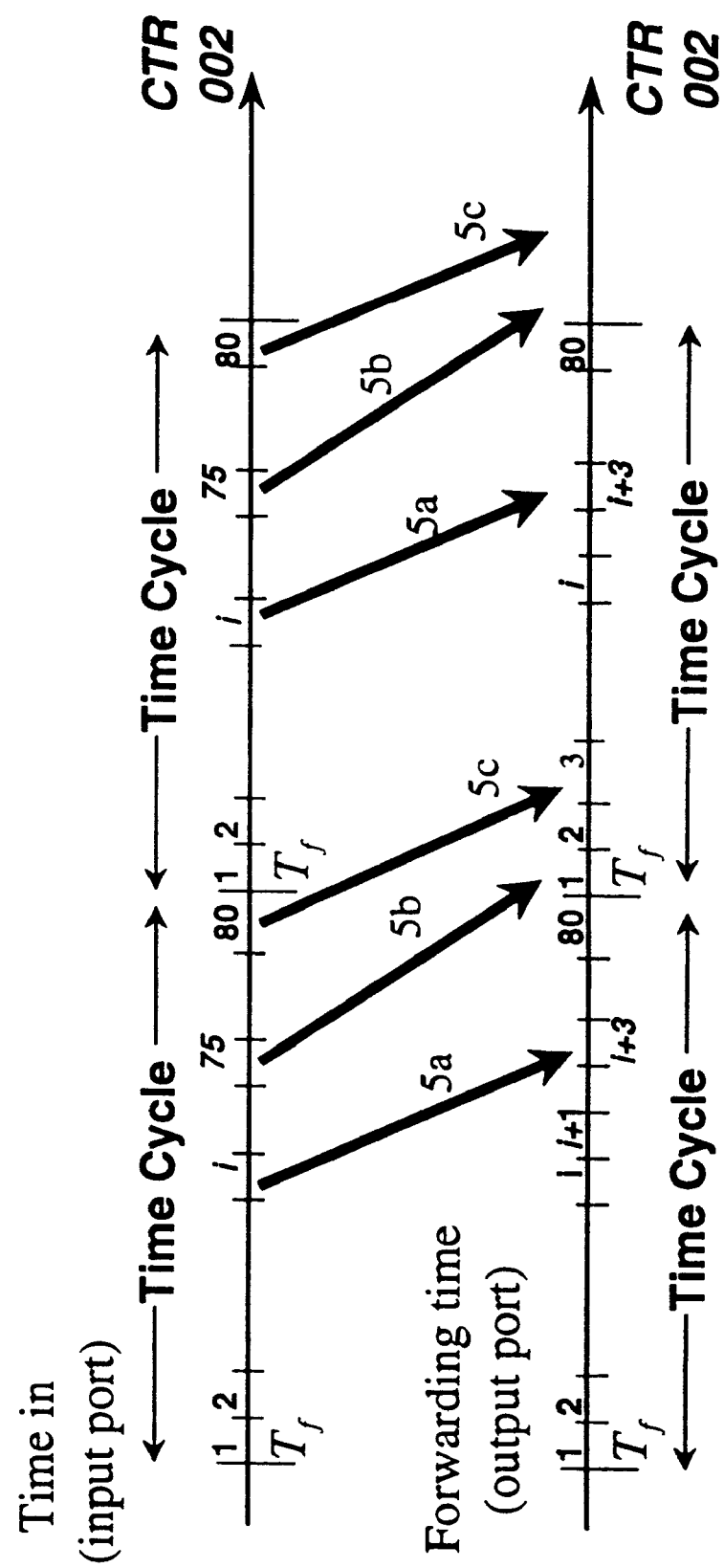
FIG. 8 is an illustrative example of the mapping of the time frames in and the time frames out of a node on a virtual pipe with variable bit rate. The mapping repeats itself in every time cycle and the mapping of the time cycle repeats itself in every super cycle. All additions are modulo 80 and variable bit rate packets forwarding time can be delayed until the next time frame of the same virtual pipe.

FIG. 8 illustrates the timing of a switch of a virtual pipe wherein there are a predefined subset of time frames (i, 75, and 80) of every time cycle, during which data packets are transferred into that switch, and wherein for that virtual pipe there are a predefined subset time frames (i+3, 1, and 3) of every time cycle, during which the data packets are transferred out of that switch. If each of the three data packets has 125 bytes or 1000 bits, and there are 80 time frames of 125 microseconds in each time cycle (i.e., time cycle duration of 10 μsec), then the bandwidth allocated to this virtual pipe is 300,000 bits per second.

In general, the bandwidth or capacity allocated for a virtual pipe is computed by dividing the number of bits transferred during each of the time cycles by the time cycle duration. In the case of a super cycle, the bandwidth allocated to a virtual pipe is computed by dividing the number of bits transferred during each of the super cycles by the super cycle duration.

The switch 10 structure, as shown in FIG. 3, can also be referred to as a pipeline switch, since it enables a network comprised of such switches to operate as a large distributed pipeline architecture, as it is commonly found inside digital systems and computer architectures.

Figure 9:
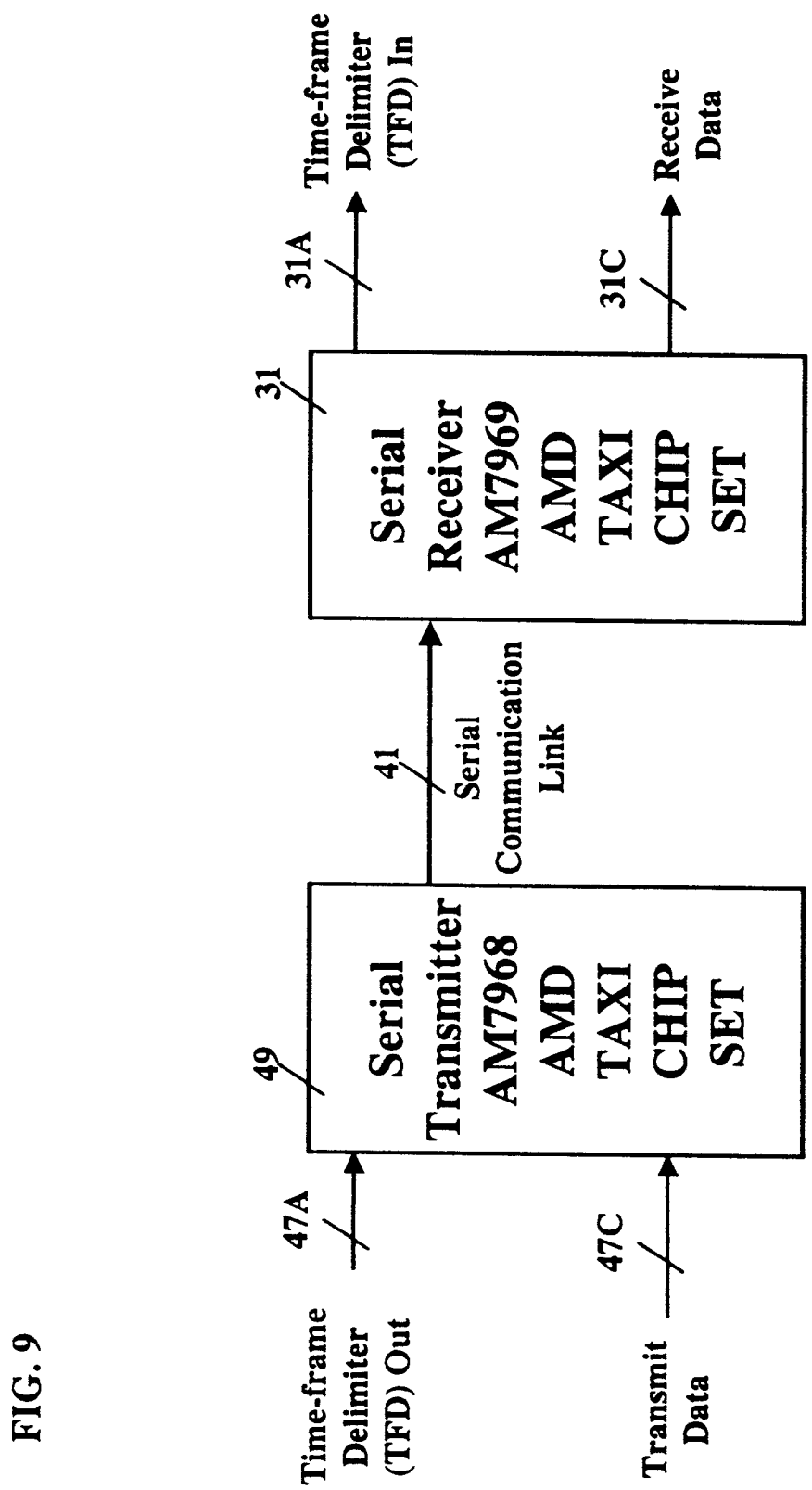
FIG. 9 is an illustration of a serial transmitter and a serial receiver.
Figure 12:
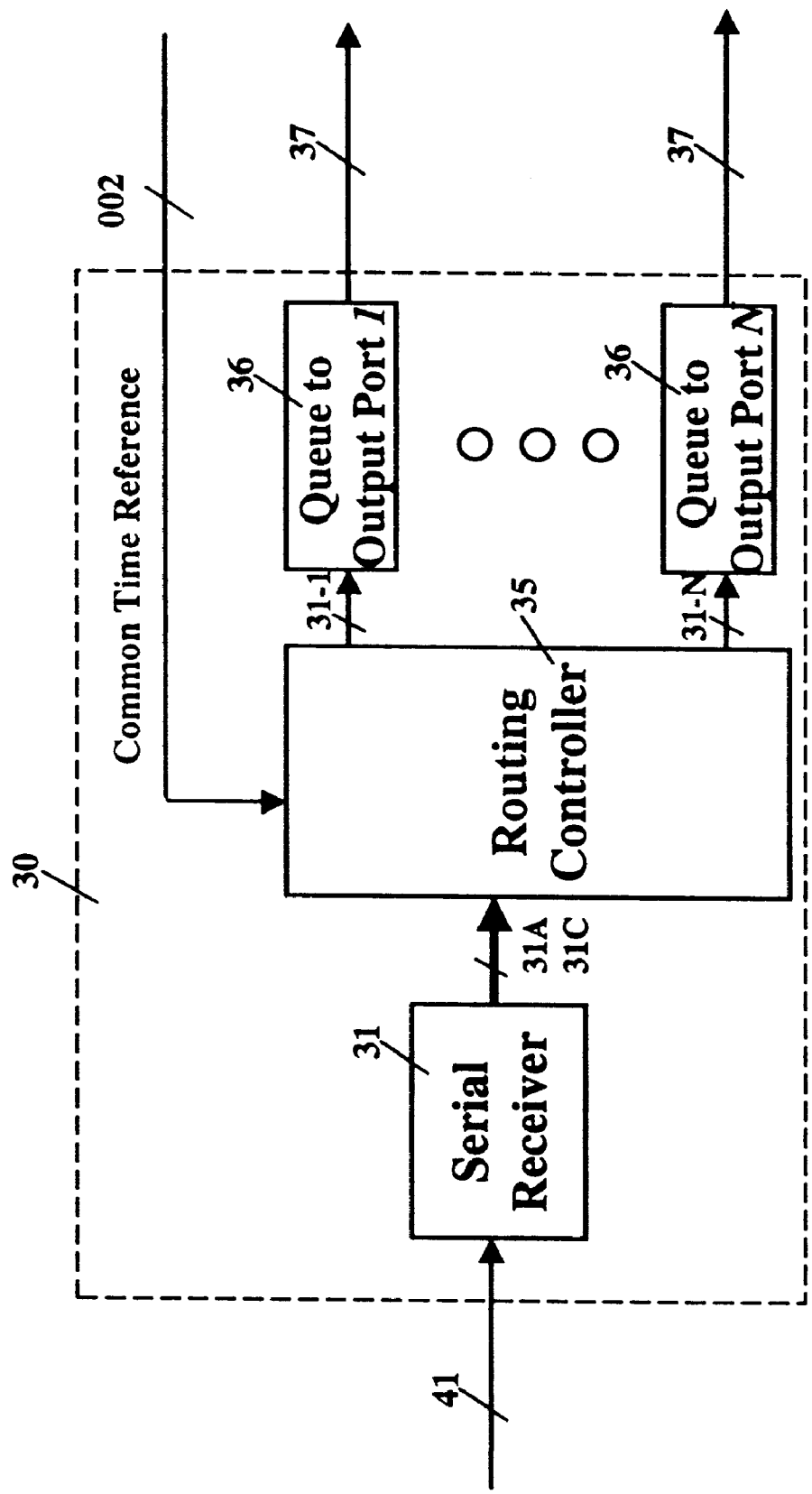
FIG. 12 is a schematic illustration of an input port with a routing controller.
Figure 13:
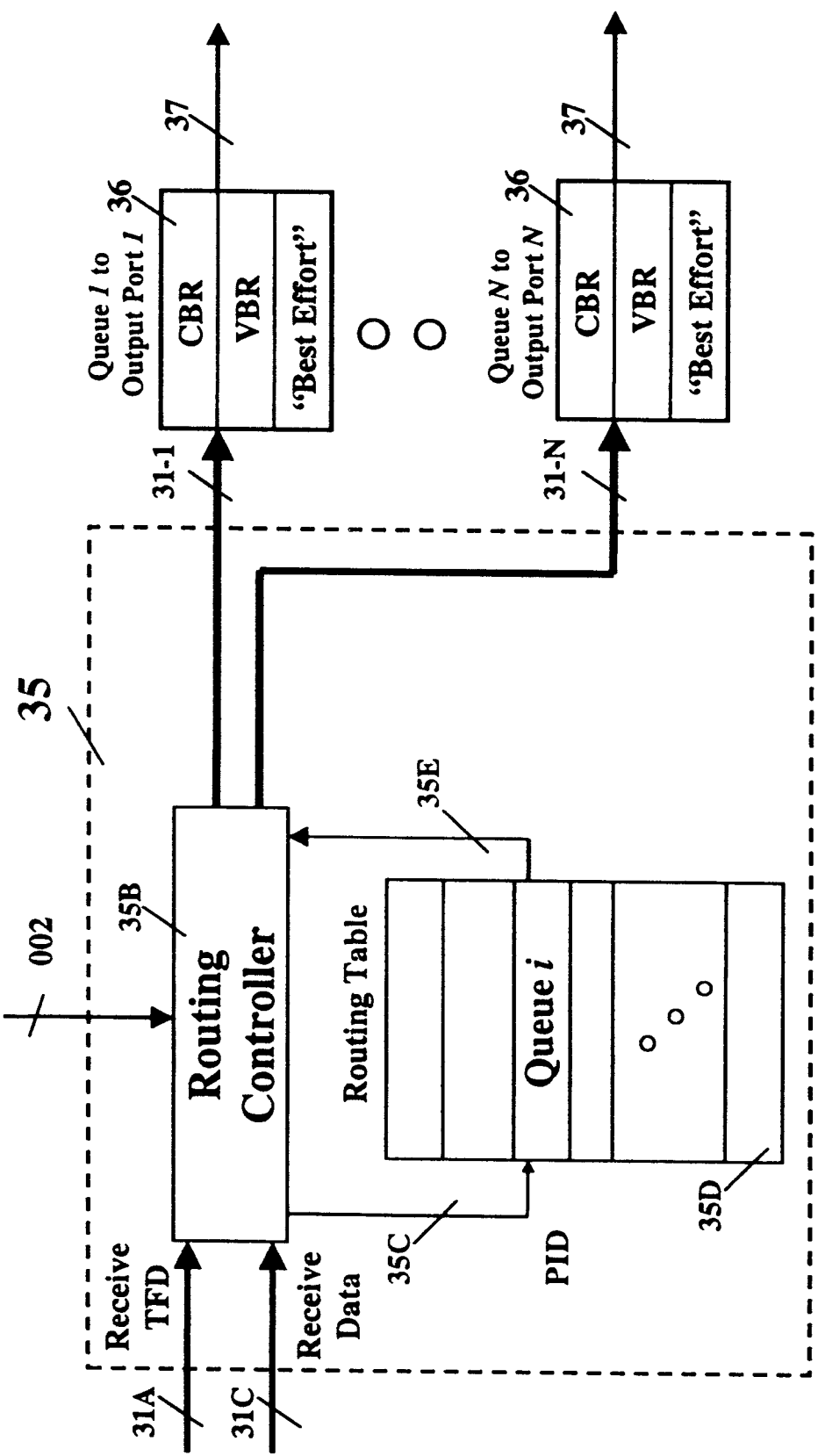
FIG. 13 is a schematic diagram of the routing controller. This unit determines to which output port an incoming data packet should be switched to and attaches the time of arrival (TOA) information to the data packet header.
Figure 16:
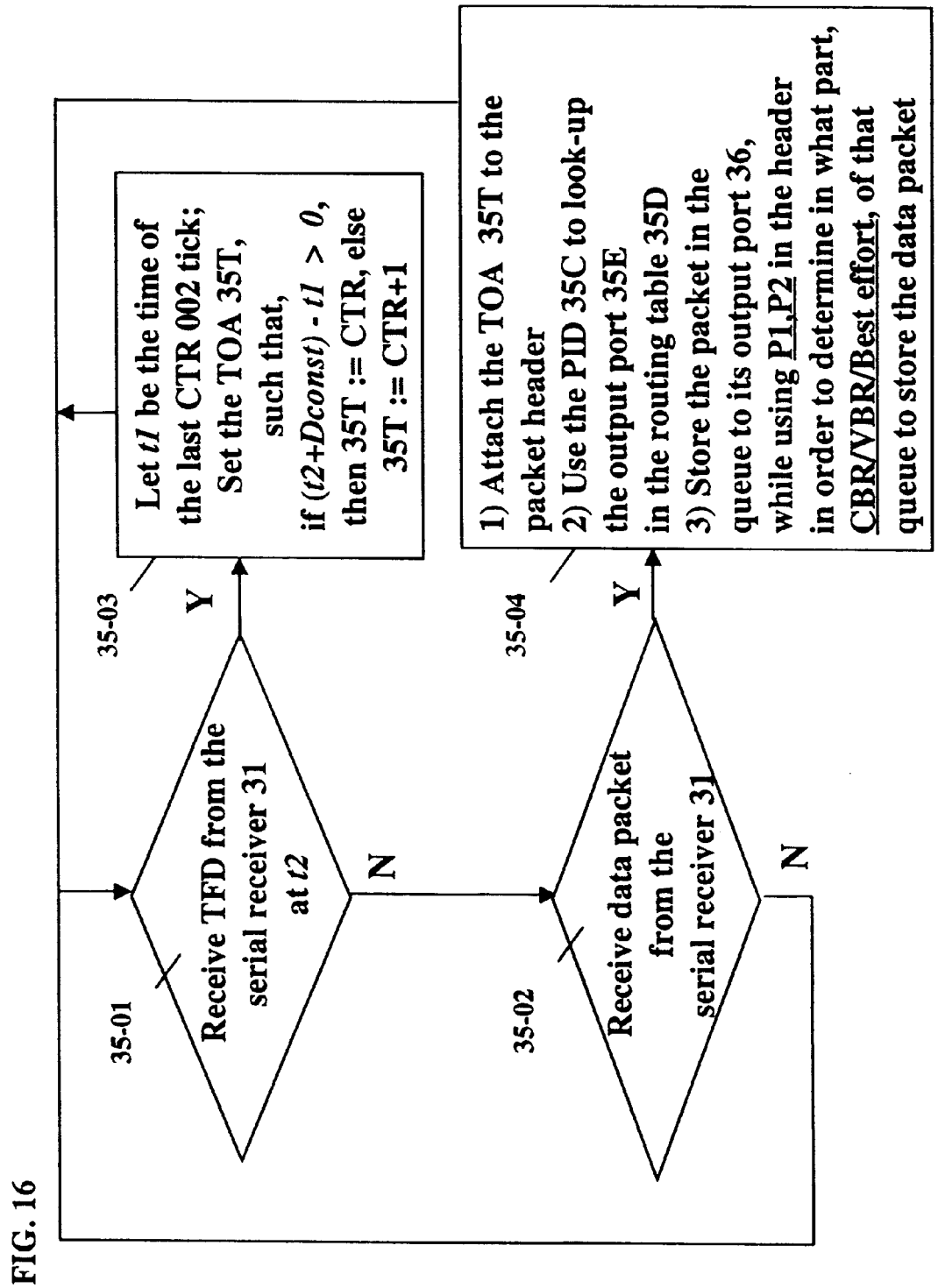
FIG. 16 is a description of the routing controller operation.

Each pipeline switch 10 is comprised of a plurality of addressable input ports 30 and output ports 40. As illustrated in FIG. 12, the input port 30 is further comprised of a routing controller 35 for mapping each of the data packets that arrives at each one of the input ports to a respective one of the output ports. As illustrated in FIG. 16, the output port 40 is further comprised of a scheduling controller and transmit buffer 45. An output port 40 is connected to an input port 30 via a communication link 41, as shown in FIG. 9. The communication link can be realized using various technologies compatible with the present invention.

As shown in FIG. 3, the common time reference 002 is provided to the input ports 30 and output ports 40 from the GPS time receiver 20, which receives its timing signal from the GPS antenna 001. GPS time receivers are available from variety of manufacturers, such as, TrueTime, Inc. (Santa Rosa, Calif.). With such equipment, it is possible to maintain a local clock with accuracy of ±1 microsecond from the UTC (Coordinated Universal Time) standard everywhere around the globe.

The Communication Link and Time Frame Delimiter Encoding

The communication links 41 used for the system disclosed is in this invention can be of various types: fiber optic, wireless, etc. The wireless links can be between at least one of a ground station and a satellite, between two satellites orbiting the earth, or between two ground stations, as examples.

Referring to FIG. 9, a serial transmitter 49 and serial receiver 31 are illustrated as coupled to each link 41. A variety of encoding schemes can be used for a serial line link 41 in the context of this invention, such as, SONET/SDH, 8B/10B Fiber Channel, 4B/5B FDDI. In addition to the encoding and decoding of the data transmitted over the serial link, the serial transmitter/receiver (49/31) sends/receives control words for a variety of control purposes, mostly unrelated to the present invention description. However, one control word, time frame delimiter (TFD), is used in accordance with the present invention. The TFD marks the boundary between two successive time frames and is sent by a serial transmitter 49 when a CTR 002 clock tick occurs in a way that is described hereafter as part of the output port operation. It is necessary to distinguish in an unambiguous manner between the data words, which carry the information, and the control signal or words (e.g., the TFD is a control signal) over the serial link 41. There are many ways to do this. One way is to use the known 4B/5B encoding scheme (used FDDI). In this scheme, every 8-bit character is divided into two 4-bit parts and then each part is encoded into a 5-bit codeword that is transmitted over the serial link 41.

FIG. 10 illustrates an encoding table from 4-bit data to 5-bit serial codewords. The 4B/5B is a redundant encoding scheme, which means that there are more codewords than data words. Consequently, some of the unused or redundant serial codewords can be used to convey control information.

FIG. 11 is a table with 15 possible encoded control codewords, which can be used for transferring the time frame delimiter (TFD) over the serial link. The TFD transfer is completely transparent to the data transfer, and therefore, it can be sent in the middle of the data packet transmission in a non-destructive manner.

When the communication links 41 are SONET/SDH, the time frame delimiter cannot be embedded as redundant serial codewords, since SONET/SDH serial encoding is based on scrambling with no redundancy. Consequently, the TFD is implemented using the SONET/SDH frame control fields: transport overhead (TOH) and path overhead (POH). Note that although SONET/SDH uses a 125 microseconds frame, it cannot be used directly in accordance with the present invention, at the moment, since SONET/SDH frames are not globally aligned and are also not aligned to UTC. However, if SONET/SDH frames are globally aligned, SONET/SDH can be used compatibly with the present invention.

The Input Port

The input port 30, shown in FIG. 12, has three parts: serial receiver 31, routing controller 35 and separate queues to the output ports 36. The serial receiver 31 transfers to the routing controller 35 the data packets and the time frame delimiters.

Figures 14A, 14B:
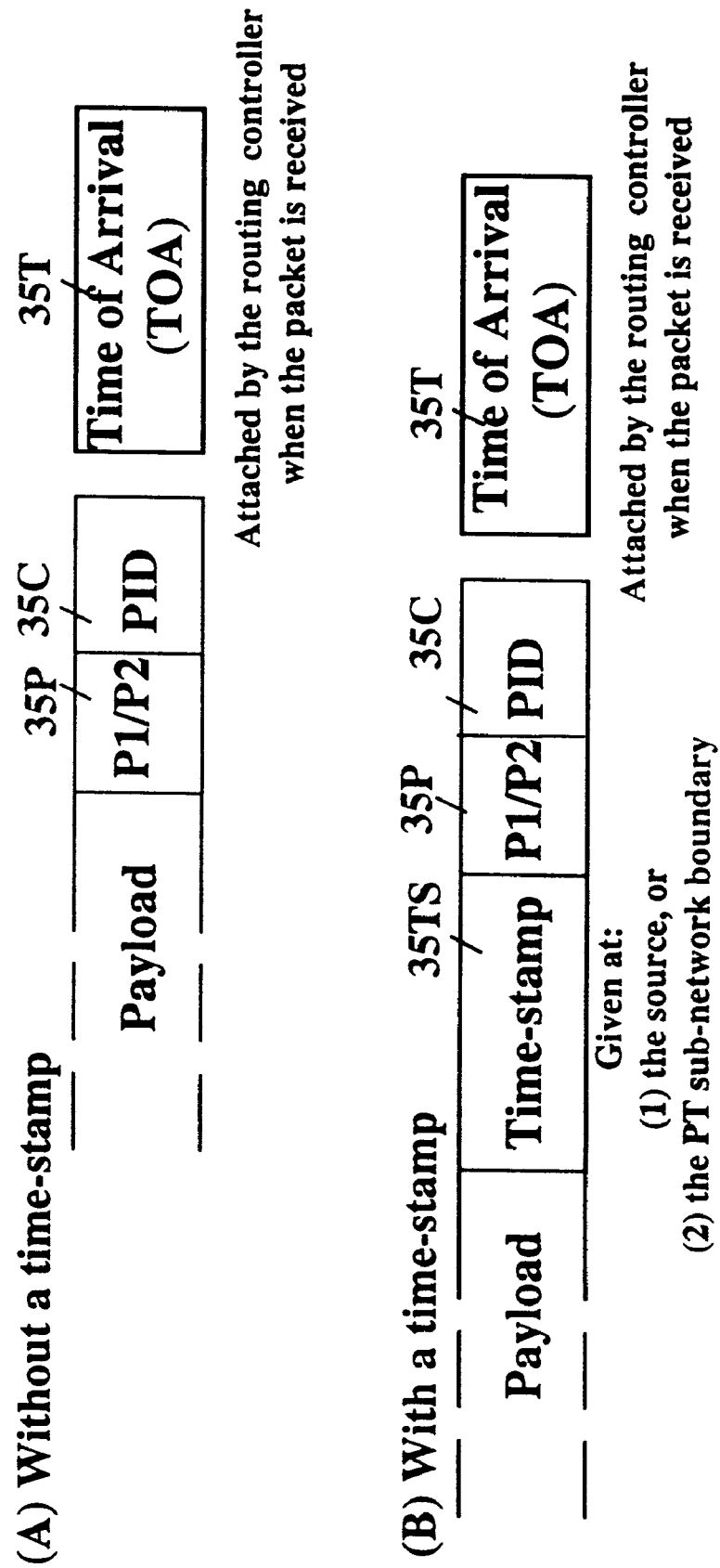
FIGS. 14A and 14B are schematic illustrations of two generic data packet headers with virtual pipe ID (PID) and priority bit (P): (A) a packet without a time-stamp field and (B) a packet with a time-stamp field. This drawing also shows how the common time-reference value, time of arrival (TOA), is attached by the routing controller.

The routing controller is constructed of a central processing unit (CPU), a random access memory (RAM) for storing the data packet, read only memory (ROM) for storing the routing controller processing program, and routing table is used for determining the output port that the incoming data packet should be switched to. The incoming data packet header includes a virtual pipe identification—PID 35C in FIG. 14, that is used to lookup in the routing table 35D the address 35E of the queue the incoming data packet should be transferred into 36. Before the packet is transferred into its queue 36 the time of arrival (TOA) 35T in FIG. 14 is attached to the packet header. The TOA 35T will be used by the scheduling controller 45 in FIG. 17 in the computation of the forwarding time out of the output port.

The data packet can have various formats, such as, Internet protocol version 4 (IPv4), Internet protocol version 6 (IPv6), asynchronous transfer mode (ATM) cells. The data packets PID can be determined by one of the following: an Internet protocol (IP) address, an asynchronous transfer mode (ATM) a virtual circuit identifier, and a virtual path identifier (VCI/VPI), Internet protocol version 6 (IPv6) addresses, Internet MPLS (multi protocol label swapping or tag switching) labels, and IEEE 802 MAC (media access control) address.

FIG. 15 is a table for defining two bits, P1 and P2, in the packet headers in FIG. 14. The two bits classify three types of data packets: P1/P2 are 00 constant bit rate (CBR) data traffic, P1,P2 are 01 variable bit rate (VBR) data traffic, P1,P2 are 10 "best effort" data traffic. The above classification is used by the program executed by the routing controller 35B, as shown in FIG. 16, in order to determine into which of the three parts of the queue to the output port 36, shown in FIG. 13, the data packet should be switched into.

FIG. 16 is a detailed description of the program executed by the routing controller 35B. The program is responsive to two basic events from the serial receiver 31: receive time frame delimiter TFD 35-01, and receive data packet 35-02. After receiving a TFD the routing controller computes the time of arrival (TOA) 35T value 35-03 in FIG. 14, that is attached to the incoming data packets. For this computation it uses a constant, Dconst, which is the time difference between the common time reference (CTR) 002 tick and the reception of the TFD at time t2 (note that the TFD was generated on an adjacent switch by the CTR 002 on that node). This time difference is caused by the fact that the delay from the serial transmitter 49 to the serial receiver 31 is not an integer number of time frames. When data packet is received 35-02 the routing controller 35B executes three operations 35-04 in FIG. 16: attach the TOA, lookup the address of the queue 36 using the PID, and storing the data packet in the queue 36 to the output port 36, while using P1/P2 in the header, in FIG. 14, in order to determine in what part, CBR/VBR/Best effort, of that queue to store the incoming data packet.

Multicast—One-to-many Forwarding

Data packets with certain predefined PIDs are forwarded more that output ports, in which case the table 35D has multiple queue values. The data packet is then copied to all those queues by the routing controller 35B, as was previously described, and consequently the data packet will be forwarded to multiple output ports.

The Switching Fabric

There are various ways to implement a switching fabric, however, since the switching fabric is not the subject of this invention it will be described only briefly. The main property that the switching fabric should ensure is that packets for which the priority bits P1/P2 are 00 (see FIG. 14), gets high priority (i.e., reserved traffic), and will be switched into the output port in a constant bounded delay—measured in time frames.

Figure 17:
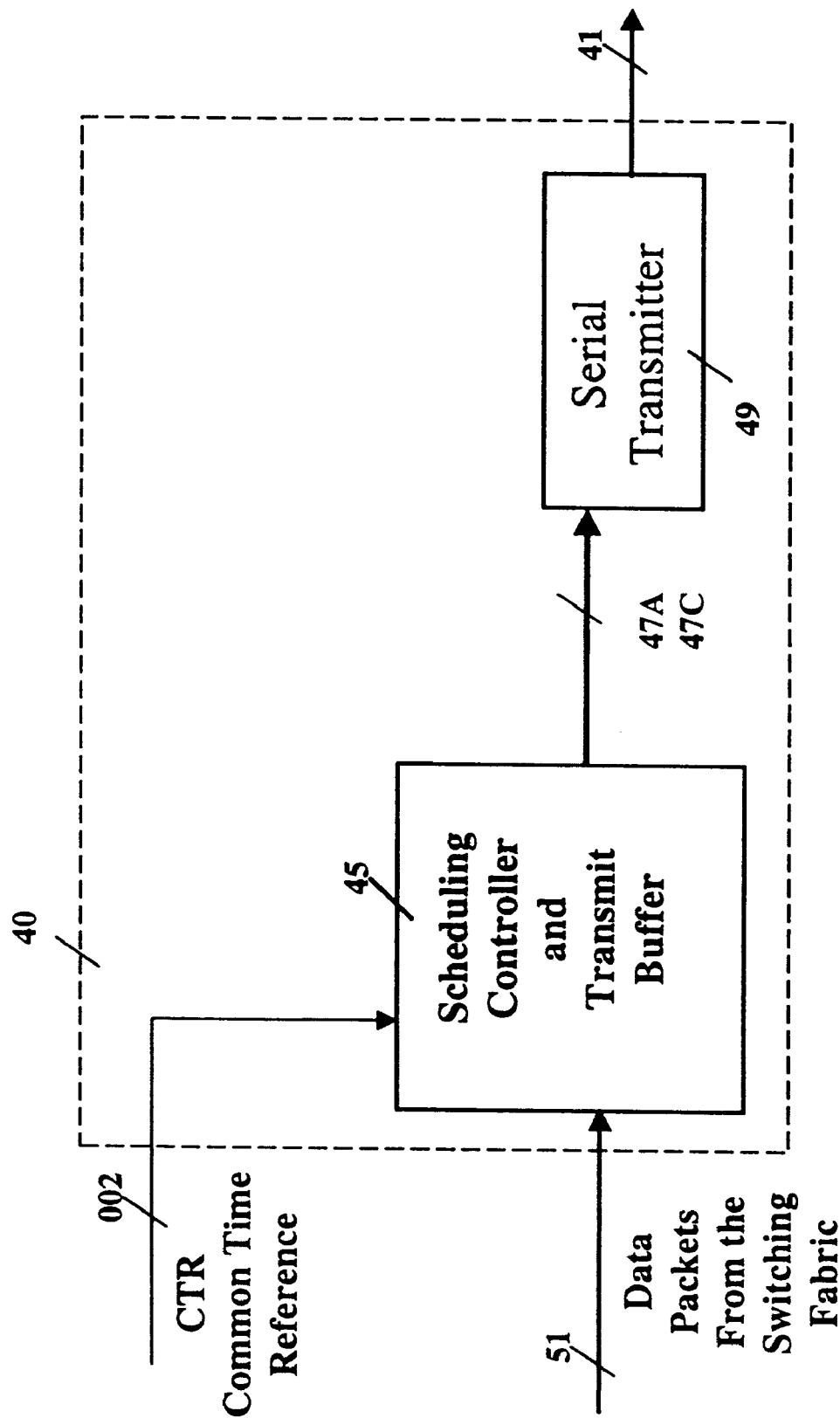
FIG. 17 is a schematic illustration of an output port with a scheduling controller and a serial transmitter.

This is possible when the packets in the input ports are already separated into queues to their respective output ports, then by using the Clos theorem in the time domain (see J. Y. Hui "Switching and Traffic Theory for Integrated Broadband Networks," page 65) the delay can be bounded by two time frames—one time frame at the input port and one time frame to get across the switching fabric. Other implementation can be based on shared bus with round robin service of the high priority data packets or on a crossbar switch The Output Port The output is depicted in FIG. 17, it has two parts a scheduling controller with a transmit buffer 45, and a serial transmitter 49, which was described before. The scheduling controller performs a mapping of each of the data packets between the associated respective time of arrival (TOA) and an associated forwarding time out of the output port via the serial transmitter. The forwarding time is determined relative to the common time reference (CTR) 002, as it is described in the following.

Figure 18:
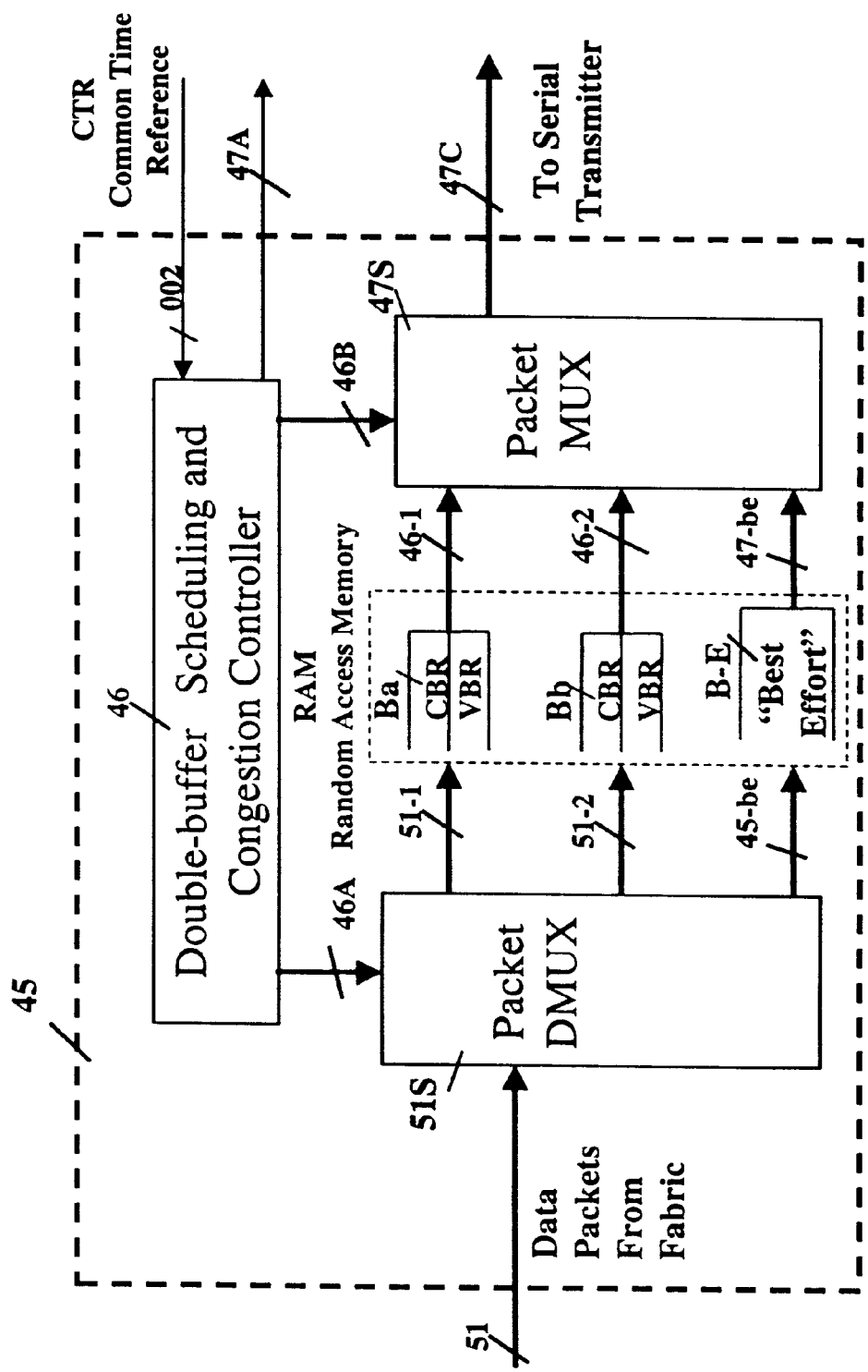
FIG. 18 is a functional description of the transmit scheduler with a double buffer, where each buffer is divided into two parts, one for constant bit rate (CBR) and the other for variable bit rate (VBR)
Figure 20:
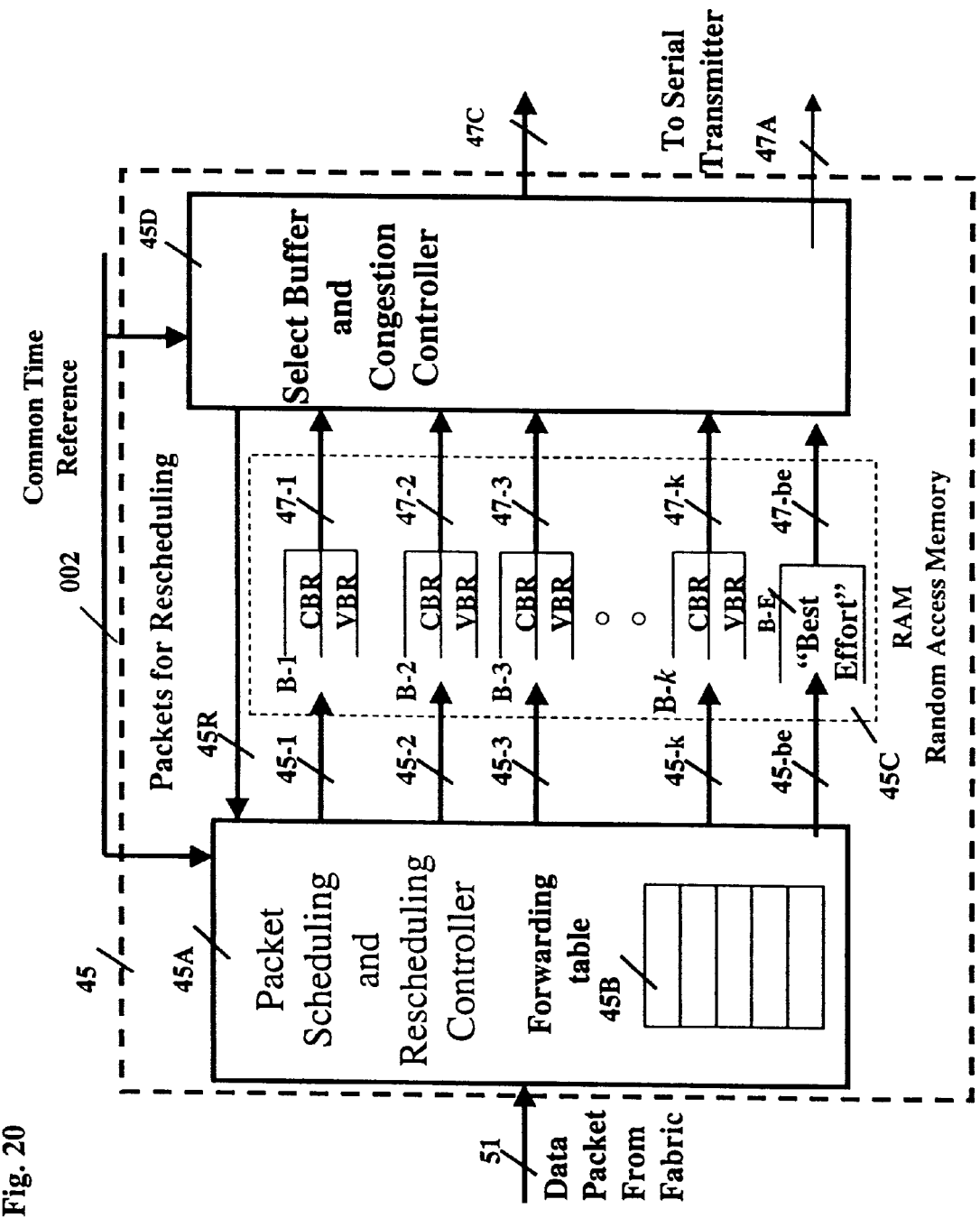
FIG. 20 is a functional description of the transmit buffer and scheduling and congestion controller.
Figure 21:
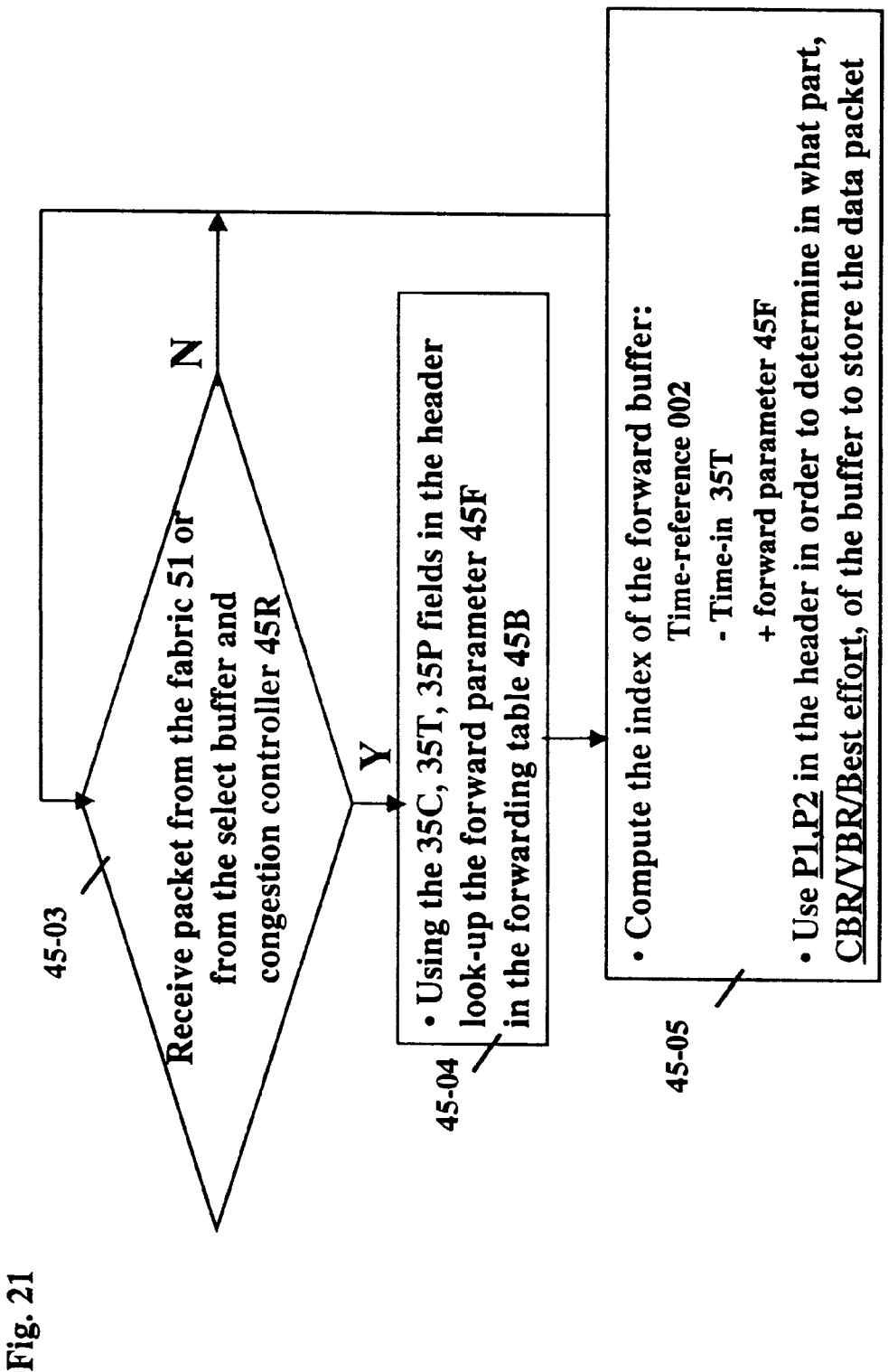
FIG. 21 is a flow diagram describing the packet scheduling and rescheduling controller operation for computing the forwarding time of a packet based on the following input parameters: pipe-ID 35C, Time of arrival 35T and the common time reference 002.
Figure 22:
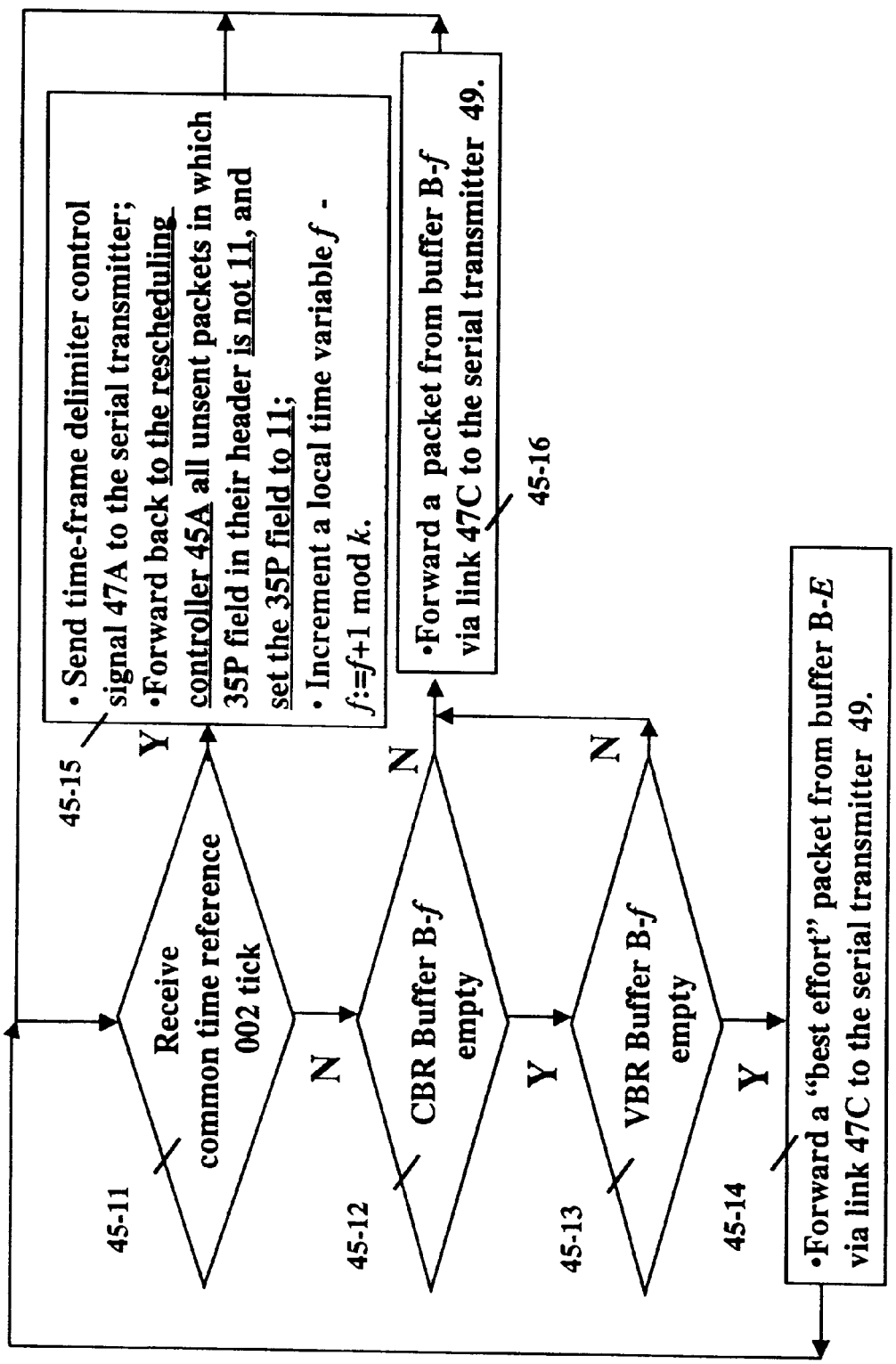
FIG. 22 is a flow diagram describing the select buffer and congestion controller 45D.
Figure 23:
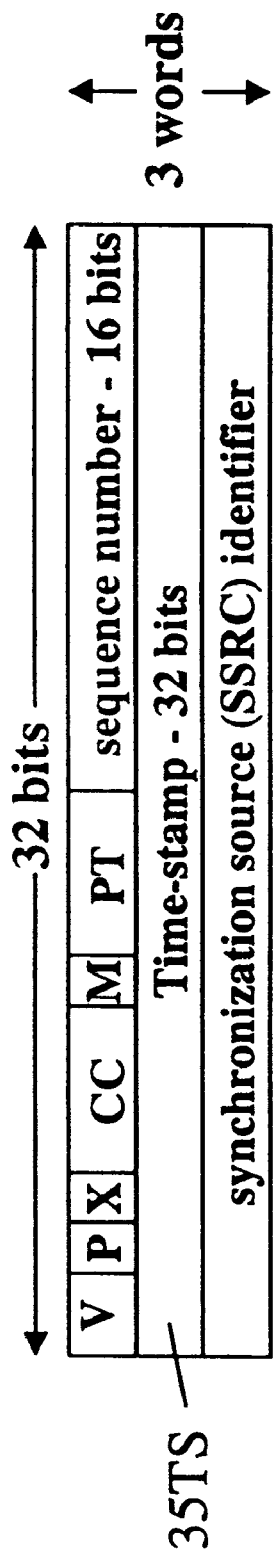
FIG. 23 is a description of the real-time protocol (RTP) packet header with time-stamp 35TS field of 32 bits.
Figure 24:
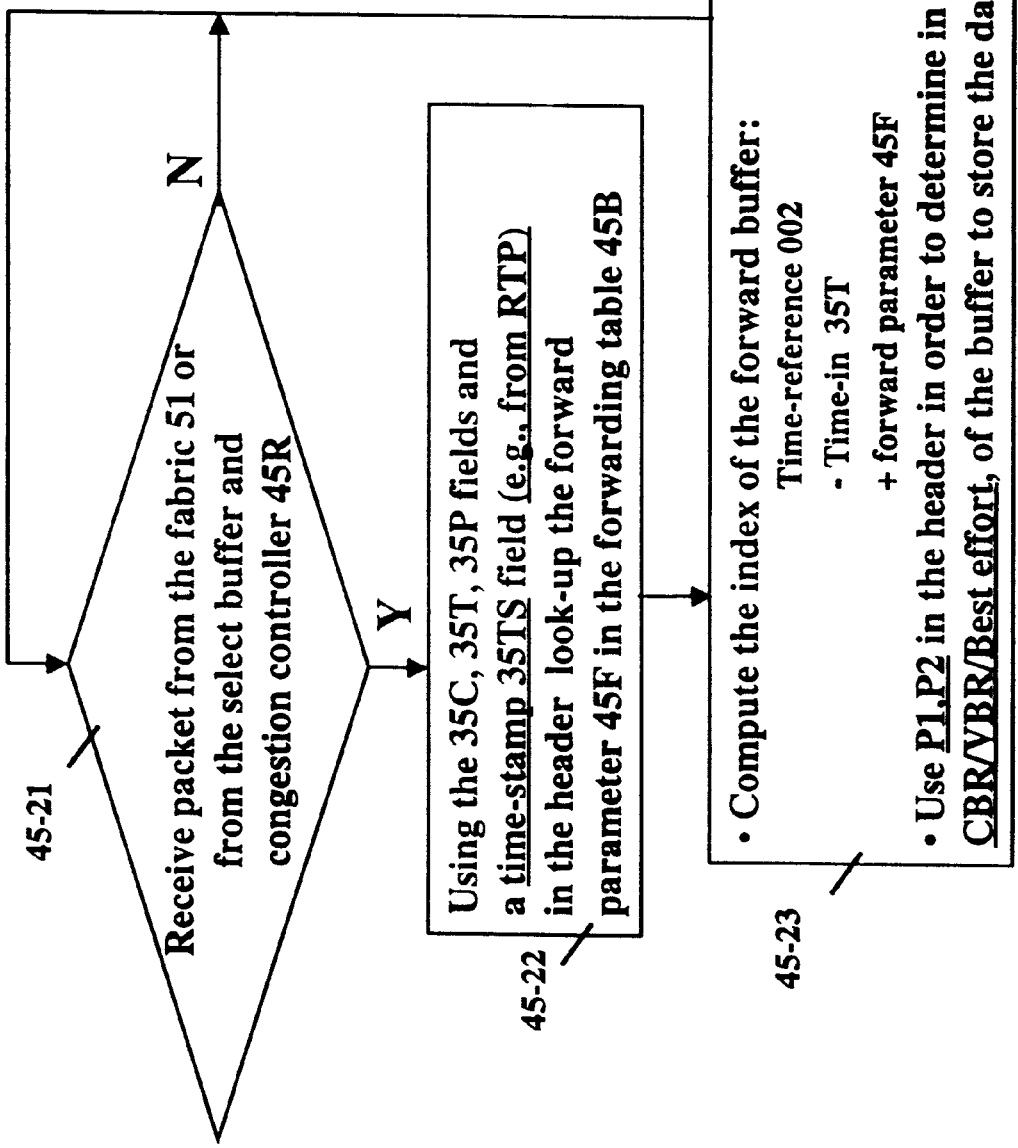
FIG. 24 is a flow diagram describing the packet scheduling and rescheduling controller operation for computing the forwarding time of a packet based on the following input parameters: pipe-ID, Time of arrival 35T, common time reference 002 and a time-stamp 35TS.

Three output port configurations are disclosed: double-buffer scheduling and congestion controller, as depicted in FIGS. 18–19, a general scheduling controller, as depicted in FIGS. 20–22, and a general scheduling controller with time-stamp, as depicted in FIGS. 23–24.

A Double-buffer Operation

The double-buffer scheduling and congestion controller, in FIGS. 18–19, is constructed of a central processing unit (CPU), a random access memory (RAM) for storing the data packet, read only memory (ROM) for storing the controller processing program, and it operates in the following manner.

In FIG. 18, data packets that arrive from the switching fabric 50 via link 51 in which their type or priority bits P1/P2 are either 00 or 01 (35P in FIG. 14), i.e., CBR or VBR traffic, will be switched through the packet DMUX (demultiplexer) 51S during odd ticks of the common time reference to buffer Ba via link 51-1, and during even ticks of the common time reference to buffer Bb via link 51-2. The data packets in which their P1/P2 bits are 00 are stored in the CBR part of the Ba and Bb buffers, and data packets in which their P1/P2 bits are 01 are stored in the VBR part of the Ba and Bb buffers.

In FIG. 18, data packet in which their type or priority bits P1/P2 are 10 will be switched through the packet DMUX (demultiplexer) 51S to the "best effort" buffer B-E via link 51-be. This operation is specified in 45-02 in FIG. 19. The transmit buffer selection operation is controlled by the select signal 46A, which connects the double-buffer scheduling controller with the packet DMUX (demultiplexer) 51S.

Data packets are forwarded to the serial transmitter 49 through the packet MUX (multiplexer) 47S and link 47C in FIG. 18. During the odd ticks of the common time reference packets are forwarded from buffer Bb via link 46-2, and during even ticks of the common time reference packets are forwarded from buffer Ba via link 46-1. During each of the time frame, first CBR packets (P1/P2 are 00) are forwarded and if there are no more CBR packets, then VBR packets (P1/P2) are forwarded. If during odd ticks of the common time reference buffer Bb is empty, data packet from the "best effort" buffer B-E are forwarded to the serial transmitter, and if during even ticks of the common time reference buffer Ba is empty, data packet from the "best effort" buffer B-E are forwarded to the serial transmitter. This operation is specified in 45-02 in FIG. 19. The transmit buffer selection operation is controlled by the select signal 46B, which connects the double-buffer scheduling and congestion controller with the packet MUX (multiplexer) 47S.

General Scheduling Controller 45A

A more general scheduling controller 45 operation is described in FIGS. 20–22, which includes a scheduling and rescheduling controller 45A, a transmit buffer 45C, and a select buffer and congestion controller 45D, as shown in FIG. 20. The scheduling and rescheduling controller 45A together with the select buffer controller 45D perform the mapping of the data packet into the time frame. The mapping is done on the scheduling and rescheduling controller using the PID 35C and the data packet time of arrival (TOA) 35T in order to determine the respective time frame in which the respective packet should be forwarded out of the output port. The details are presented below. Both controllers, 45A and 45D, are constructed of a central processing unit (CPU), a random access memory (RAM) for storing the data, and read only memory (ROM) for storing the controller processing program.

In the more general configuration, depicted in FIG. 20, data packets that arrive from the switching fabric 50 via link 51 in which their priority bits 35P (P1/P2) are either 00 or 01 (i.e., reserved CBR traffic, or VBR traffic) will be switched by controller 45A to one of the k transmit buffers in 45C: B-1, B-2, . . . , B-k. Each of the k buffers is designated to store packet that will be forwarded in each of the k time frames in every time cycle, that where defined in FIGS. 5 and 6. Another possible operation is to map the incoming packets separately to each of the time frames of a super-cycle. When a super-cycle mapping is implemented there are k*l transmit buffers in 45C: **B-1, B-2, ..., B-k*l**, i.e., k buffers to each of the l cycles of a super-cycle.

The actual program executed by the scheduling and rescheduling controller is described in FIG. 21. When a data packet is received from either the fabric via link 51 or from the select buffer and congestion controller 45D via link 45R, as specified in 45-03, the 35C, 35T and 35P in the data packet header are used to look-up the forward parameter 45F in the forwarding table 45B, as specified in 45-04. Next, the index i of the transmit buffer, between B-1 and B-k, is computed in 45-05 by subtracting the time of arrival TOA 35T from the common time reference CTR 002 and by adding the forward parameter 45F, and then switching the incoming data packet to transmit buffer B-i, as specified in 45-05.

Incoming data packets in which their priority bits 35P, P1/P2, are either 10 (i.e., non-reserved traffic or "best effort") or 11 (i.e., rescheduled packet) are switched by the scheduling and rescheduling controller to the transmit "best effort" buffer B-E via link 45-be.

FIG. 22 depicts the operation of the select buffer and congestion controller 45D operation, which is responsive to the common time reference (CTR) tick 002. When CTR signal is received 45-11 the following operations are executed by controller 45D in 45-15:
1. Send time frame delimiter (TFD) control signal 47A to the serial transmitter 49;
2. Forward back to controller 45A all unsent packets in transmit buffer B-f in which the 35P field in their header is not 11, i.e., it is not a rescheduled packet and set the 35P field to 11, i.e., a rescheduled packet (note that a packet can be rescheduled only once); If the number of data packets need to be rescheduled exceeds some predefined number, say n, then select at random n data packets and sends them back to the packet scheduling and rescheduling controller 45A via link 45R and discard the remainder of the packets.
3. Increment the transmit buffer index f (i.e.,f:=f+1 mod k, where k is the time cycle size in time frames). If the CBR part of buffer B-f is not empty 45-12, then it will send a data packet from transmit buffer B-f first CBR packets and then VBR packets, as specified in 45-16 and 45-13, else it will send a "best effort" data packet from the "best effort" buffer B-E as specified in 45-14.

General Scheduling Controller 45A with Time-stamp 35TS

FIGS. 23–24 describe a more general operation of the 45A controller since it incorporates into its scheduling and rescheduling operation the time stamp value in the data packet header 35TS. The time-stamp 35TS can be generated, for example, by an Internet real-time protocol (RTP) in which its data packet header format is depicted in FIG. 23. Alternatively the time-stamp is generated by a predefined one of the switches in the system, or alternatively the time stamp is generated at the respective end station for inclusion in the respective originated data packet header.

The actual program executed by the 45A controller when the data packet header include a time-stamp 35TS field (see FIGS. 14 and 23) is described in FIG. 24. When a data packet is received from either the fabric via link 51 or from the select buffer and congestion controller 45D via link 45R, as specified in 45-21, the time-stamp 35TS, 35C, 35T and 35P in the data packet header are used to look-up the forward parameter 4SF in the forwarding table 45B, as specified in 45-22. Next, the index i of the transmit buffer, between B-1 and B-k, is computed in 45-23 by subtracting the time of arrival TOA 35T from the common time reference CTR 002 and by adding the forward parameter 45F, and then switching the incoming data packet to transmit buffer B-i, as specified in 45-23. Incoming data packets in which their priority bits 35P, P1/P2, are either 10 (i.e., non-reserved traffic or "best effort") or 11 (i.e., rescheduled packet) are switched by the scheduling and rescheduling controller to the transmit "best effort" buffer B-E via link 45-be.

In another configuration of the scheduling and rescheduling controller 45A, the time stamp 35TS is used in order to determine a delay count. Such a delay count can be realized by the time stamp 35TS value from the current common time reference 002 value. When the delay count is either greater than a first predefined value or smaller than a second predefined value the data packet is discarded The first and second predefined values can be determined by looking them up with the PID 35C in the forwarding table 45B.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A system for transferring packet data from at least one source to at least one destination wherein the transfer of the data packet is provided during respective ones of a plurality of predefined time intervals, wherein each of the predefined time intervals is comprised of a plurality of predefined time frames, comprising:

a virtual pipe comprising at least two switches interconnected via communication links, each of the switches having a plurality of input ports and output ports, each with a unique address for receiving the data packets;

a routing controller for mapping each of the data packets that arrives at each one of the input ports to a respective one of the output ports;

a common time reference signal coupled to each of the switches;

a packet scheduling and rescheduling controller, wherein for each switch there is a first scheduled time within a first predefined time frame within which a respective packet is scheduled to be transferred out of the respective switch determined by said packet scheduling and rescheduling controller;

wherein the time frames and the first scheduled time frame are determined responsive to the common time reference; and wherein the position of a data packet in a time fame is arbitrary.

2. The system as in claim 1, wherein for each of the time frames there is a defined bandwidth limiting the capacity to transmit the packets during the time frame, the system further comprised of:

a select buffer and congestion controller for determining congestion responsive to the defined bandwidth being exceeded by the scheduling controller and for a respective one of the time frames;

a rescheduling controller responsive to the determination of congestion for a particular one of the time frames, for rescheduling selected ones of the packets to be associated with a second predefined time within a second predefined time frame for transfer of the respective packets out from the respective switch.

3. The system as in claim 1, wherein there are a plurality of virtual pipes, wherein there is an overlap of at least one of the switches within at least two of the virtual pipes, wherein the same link between two adjacent switches is used simultaneously by the at least two of the virtual pipes.

4. The system as in claim 1, wherein there are a plurality of the virtual pipes, wherein the data packets for at least two of the virtual pipes are transferred during the same predefined time frame.

5. The system as in claim 2 wherein the rescheduling of selected ones of the packets are determined at random from a predefined set of the time frames.

6. The system as in claim 2 wherein each of the data packets is comprised of priority bits, wherein the rescheduling of selected ones of the packets is responsive to the priority bits of the respective one of the data packets.

7. The system as in claim 1, wherein there are a plurality of virtual pipes, wherein each of the data packets is associated with one of the respective virtual pipes, wherein for each virtual pipe there is an associated predefined allotted packet capacity for each time frame, the system further comprising:
   logic responsive to the first scheduled time and to the allotted data packet capacity for each of the respective time frames for each of the respective virtual pipes for marking respective ones of the packets for rescheduling.

8. The system as in claim 7, wherein the marked respective packet is rescheduled to the next sequential time frame of the associated virtual pipe, responsive to the marking of the packets for rescheduling.

9. The system as in claim 7, wherein each of the packets is comprised of a header with a time delay count field,
   wherein the marked respective packet is rescheduled for a subsequent one of the time frames responsive to the delay count field being less than a predefined threshold.

10. The system as in claim 9, wherein the delay count field is a time stamp and said delay count is determined by computing the time difference between the time stamp value and the common time reference value.

11. The system as in claim 9, wherein the marked respective data packet is discarded from scheduling for the respective virtual pipe, responsive to the delay count being greater than the predefined threshold.

12. The system as in claim 11, wherein the respective discarded data packet from said virtual pipe is forwarded independent and outside of the respective virtual pipe.

13. The system as in claim 11, wherein the respective discarded data packet from said virtual pipe is forwarded as "best effort" data packets.

14. The system as in claim 1, wherein the predefined time interval is comprised of a fixed number of contiguous time frames comprising a time cycle.

15. The system as in claim 14, wherein the time cycles are contiguous.

16. The system as in claim 14, wherein the time frames, associated with a particular one of the switches within the virtual pipe, are associated for the same respective switches in all the time cycles.

17. The system as in claim 16, wherein the time frames associated with the particular ones of the switches are associated with one of input into and output from the respective switches.

18. The system as in claim 15, wherein a fixed number of a plurality of contiguous ones of the time cycles comprise a super cycle; wherein the super cycle is periodic.

19. The system as in claim 1, wherein the common time reference signal coupled to each of the switches comes from GPS (Global Positioning System).

20. The system as in claim 1, wherein the common time reference signal coupled to each of the switches conforms to UTC (Coordinated Universal Time) standard.

21. The system as in claim 20, wherein the super cycle duration is equal to one second as measured using the UTC (Coordinated Universal Time) standard.

22. The system as in claim 20, wherein the super cycle duration is equal to a predefined number of seconds as measured using the UTC (Coordinated Universal Time) standard.

23. The system as in claim 20, wherein the super cycle duration is equal to a predefined fraction of a second measured using the UTC (Coordinated Universal Time) standard.

24. The system as in claim 18, wherein the time frames associated with the particular ones of the switches are repetitive within each of the time cycles within the super cycle.

25. The system as in claim 1, further comprising:
   a select buffer and congestion controller for mapping a respective one of the time frames for output from a first one of the switches to a second respective one of the time frames for output via the communications link to a second one of the switches.

26. The system as in claim 25, wherein each of the data packets is encoded as a stream of data;
   wherein a time frame delimiter is inserted into the stream of data responsive to the scheduling controller and transmit buffer.

27. The system as in claim 1, wherein there are a plurality of related local clock signals derived from the common time reference signal;
   wherein a synchronization envelope is associated with the common time reference,
   wherein two adjacent synchronization envelopes of two adjacent time frames are non-overlapping; and
   wherein all the related local clock signals fall within a respective one of the synchronization envelope.

28. The system as in claim 27, wherein between every two successive time frames the select buffer controller sends a time frame delimiter (TFD) signal via the serial transmitter.

29. The system as in claim 28, wherein the time frame delimiter can be sent as an encoded control codeword within the data packet without adversely affecting the transmission of said data packet.

30. The system as in claim 29, wherein all data packets received between two successive time frame delimiters (TFDs), received by the routing controller, are associated with a unique one of the time frames.

31. The system as in claim 1, wherein the communication links are wireless communication links.

32. The system as in claim 1, wherein the communication links are wireless communication links between at least one of a ground station and a satellite and between two satellites orbiting the earth.

33. The system as in claim 1, wherein the data packets are at least one of Internet protocol (IP) data packets, asynchronous transfer mode (ATM) cells.

34. The system as in claim 1, wherein the data packets forwarded over the same virtual pipe each have an associated pipe identification (PID);
   wherein the routing controller is responsive to the associated PID.

35. The system as in claim 34, wherein the PID is at least one of an Internet protocol (IP) address, an asynchronous transfer mode (ATM) a virtual circuit identifier, and a virtual path identifier (VCI/VPI).

36. The system as in claim 1, wherein the routing controller utilizes at least one of Internet protocol version 4 (IPv4) and Internet protocol version 6 (IPv6) addresses, Internet MPLS (multi protocol label swapping or tag switching) labels, ATM virtual circuit identifier and virtual path identifier (VCI/VPI), and IEEE 802 MAC (media access control) addresses for mapping from said input port to said output port.

37. The system as in claim 1, further comprising a scheduling controller, wherein each of the data packets is comprised of a header, having an associated time stamp, wherein for each of the mappings by the routing controller, there is an associated mapping by the scheduling controller, wherein the scheduling controller provides for mapping of each of the data packets responsive to the respective associated time stamp and an associated time out, wherein the time out is associated with a unique one of the predefined time frames.

38. The system as in claim 37, wherein the time-stamp is generated by an Internet real-time protocol (RTP).

39. The system as in claim 37, wherein the time-stamp is generated by a predefined one of the switches.

40. The system as in claim 37, wherein each of the data packets is originated from an end station, wherein the time-stamp is generated at the respective end station for inclusion in the respective originated data packet.

41. A system for switching data packets, the data packets comprising a header having a PID field, from at least one source to at least one destination, wherein the transfer of the data packets is provided during respective ones of a plurality of predefined time intervals, wherein each of the predefined time intervals is comprised of a plurality of predefined time frames, said system comprising:

a plurality of switches with a plurality of uniquely addressable input ports and output ports;

a common time reference signal coupled to each of the switches;

wherein the common time reference signal is partitioned into time frames;

wherein a predefined number of contiguous time frames are grouped into a time cycle;

wherein a predefined number of contiguous time cycles are grouped into a super cycle;

a routing controller, coupled to the input ports for determining which of the plurality of output ports said data packet will be forwarded to, and for attaching a time of arrival (TOA) to the respective data packet;

a packet scheduling and rescheduling controller for assigning selected predefined time frames for transfer into and out from each of the respective switches responsive to the time of arrival, the unique address of the respective input port, and the PID field in the data packet header; and wherein for each switch there is a first predefined time frame within which a respective data packet is transferred into the respective switch, and a second predefined time frame within which the respective data packet is forwarded out of the respective switch.

42. The system as in claim 41, wherein the position of said data packet in said second predefined time frame is arbitrary.

43. The system as in claim 42, wherein the time of arrival reflects the UTC time and is represented as a time frame number within a time cycle and as time cycle number within a super cycle.

44. The system as in claim 43, wherein the second predefined time frame within which the respective data packet is forwarded out of the respective switch is determined responsive to UTC and PID.

45. The system as in claim 41, wherein a select buffer and congestion controller determines that there is no capacity for a data packet in said second predefined time frame out of said switch;

wherein the packet scheduling and rescheduling controller reschedules said data packet for output in another time frame out of said switch.

46. The system as in claim 41, wherein for each switch there is a predefined time difference, measured in time frames, between the first predefined time frame within which the respective data packet is transferred into the input port of respective switch and the second predefined time frame within which the respective data packet is forwarded out of the output port of respective switch.

47. The system as in claim 46, wherein the position of said data packet in said second predefined time frame is arbitrary.

48. The system as in claim 46, wherein for each switch the predefined time difference is predefined for each of the PID in the data packet header.

49. The system as in claim 46, wherein for each switch the predefined time difference is predefined for each of the time frames within a time cycle, for each of the PIDs in the data packet header.

50. The system as in claim 46, wherein for each switch the predefined time difference is predefined for each of theme frames within the time cycle, for all the time cycles within the super cycle, for each of the PIDs in the data packet header.

51. The system as in claim 41, wherein there are no scheduled data packet to be transmitted in a time frame, "best effort" data packets are transmitted.

52. The system as in claim 45, wherein the data packets are scheduled for transmission by the scheduling and rescheduling controller, wherein responsive to the select buffer and congestion controller determining that there are no scheduled data packets to be transmitted in a given time frame, the select buffer and congestion controller forwards "best effort" data packets for output.

53. A system for scheduling data packets on a switch comprised of a plurality of uniquely addressable input ports and a plurality of uniquely addressable output ports, wherein the transfer of the data packets is provided during respective ones of a plurality of predefined time intervals, wherein each of the predefined time intervals is comprised of a plurality of predefined time frames, said system comprising:

a common time reference signal coupled to each of the switches;

wherein the common time reference partitioned into time frames;

wherein a predefined number of contiguous k time frames are grouped into a time cycle; wherein k is at least 1;

wherein a predefined number of contiguous l time cycles are grouped into a super cycle; wherein l is at least 1;

a routing controller with a routing table for selecting at least one of the output ports said data packets will be forwarded to;

wherein the routing controller is coupled to the input port and provides for attaching a time of arrival (TOA) to incoming ones of the data packets;

wherein the time of arrival is derived from the common time reference and is represented as a time frame number within a time cycle and as a time cycle number within a super cycle;

a switching fabric for coupling of data packets between the input and the output ports;

a packet scheduling and rescheduling controller for scheduling respective ones of the data packets for transfer during predefined associated ones of the time frames.

54. The system as in claim 53, further comprising a select buffer and congestion controller;
wherein the packet scheduling and rescheduling controller is responsive to the reception of a data packet from the switching fabric for assigning a first predefined time frame for transferring said data packet out from the said switch responsive to the time of arrival attached to the data packet by the routing controller, the unique address of input port, and the PID in the data packet header;
wherein the select buffer and congestion controller determines if capacity is available in said first predefined time frame for transferring said data packet out from the said switch; and
wherein the packet scheduling and rescheduling controller is responsive to the reception of the data packet from the select buffer and congestion controller for assigning a second predefined time frame for transferring said data packet out from the said switch when capacity is not available.

55. The system as in claim 50, further comprising a random access memory partitioned into plurality of buffers;
wherein the random access memory is partitioned into three buffers;
wherein the first buffer stores data packets to be forwarded from said switch during odd time frames as measured by the common time reference;
wherein the second buffer stores data packets to be forwarded from said switch during even time frames as measured by the common time reference;
wherein the third buffer stores "best effort" data packets to be forwarded from said switch during odd and even time frames, whenever the first and second buffers are empty.

56. The system as in claim 55, wherein said first buffer and said second buffer are further partitioned into two parts (i) constant bit rate (CBR) and (ii) variable bit rate (VBR).

57. The system as in claim 56, wherein during each time frame the select buffer and congestion controller first transfers data packets from the CBR part and then from the VBR part of said buffer.

58. The system as in claim 53, further comprising random access memory,
wherein the random access memory is partitioned into k+1 buffers;
wherein first k buffers provide for storing data packets to be forwarded from said switch during one of the k time frames in each of said time cycle;
wherein the k+1 buffer provides for storing "best effort" data packets; and
wherein said first k buffers are further partitioned into two parts (i) constant bit rate (CBR) and (ii) variable bit rate (VBR).

59. The system as in claim 58, further comprising a select buffer and congestion controller,
wherein in each of the k time frames of the time cycle the select buffer and congestion controller forwards data packets from the corresponding one of the k buffers;
wherein said select buffer and congestion controller forwards data packets first from the CBR part of said buffer and then from the VBR part of said buffer and when said VBR part is empty said select buffer and congestion controller forwards data packets out of said "best effort" buffer.

60. The system as in claim 53, further comprising a select buffer and congestion controller and a random access memory,
wherein the random access memory is partitioned into (l times k)+1 buffers;
wherein first (l times k) buffers provide for storing data packets to be forwarded from said switch during one of the (l times k) time frames in each of said super cycle;
wherein the (l times k)+1 buffer provides for storing "best effort" data packets; and
wherein said first (l times k) buffers are further partitioned into two parts (i) constant bit rate (CBR) and (ii) variable bit rate (VBR).

61. The system as in claim 60, wherein in each of the (l times k) time frames of the super cycle, the select buffer and congestion controller forwards the respective data packets from the corresponding one of the (l times k) buffers;
wherein said select buffer and congestion controller forwards the respective data packets first from the CBR part of said buffer, and then from the VBR part of said buffer, and wherein the select buffer and congestion controller forwards data packets out of said "best effort" buffer when the said VBR part is empty.

62. The system as in claim 53, further comprising a select buffer and congestion controller, wherein between every two successive time frames the select buffer and congestion controller sends a time frame delimiter (TFD) signal via the serial transmitter.

63. The system as in claim 62, wherein the time frame delimiter can be sent as an encoded control codeword in the respective data packet without adversely affecting the transmission of said data packet.

64. A system for switching data packets comprised of a data header having a PID field and a time stamp field, from at least one source to at least one destination, wherein the transfer of the data packets is provided during respective ones of a plurality of predefined time intervals, wherein each of the predefined time intervals is comprised of a plurality of predefined time frames, said system comprising:
a plurality of switches with a plurality of uniquely addressable input and output ports;
a common time reference signal coupled to each of the switches;
wherein the common time reference is partitioned into time frames;
wherein a predefined number of contiguous time frames are grouped into a time cycle;
wherein a predefined number of contiguous time cycles are grouped into a super cycle;
a routing controller at the input port for determining uniquely the output port for forwarding of a respective data packet responsive to the PID field in the respective data packet header;
a scheduling and rescheduling controller with a forwarding table for assigning predefined time frame for transfer out from each of the respective output ports responsive to the time stamp field, the unique address of the input port, and the PID field in the data packet header.

65. The system as in claim 64, wherein the predefined time frame for transferring the data packet out is determined by adding a predefined number of time frames to the time stamp field in the data packet header.

66. The system as in claim 65, wherein the number of predefined time frames added to the time stamp field in order to determine transferring time frame of said data packet out, is determined responsive to looking this number up in the forwarding table in the scheduling controller using the PID in the data packet header as an index to said forwarding table.

67. The system as in claim 64, wherein the scheduling and rescheduling controller computes the time difference in time frames between common time reference and the time stamp in the data packet header and for discarding the respective data packet when said time difference is above a predefined time threshold.

68. The system as in claim 67, wherein the time threshold value is determined by using the PID to look-up said value in the forwarding table.

* * * * *

UNITED STATES PATENT AND TRADEMARK OFFICE
Certificate

Patent No. 6,272,131 B1                                                Patented: August 7, 2001

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Yoram Ofek, Riverdale, NY; and Mario Baldi, Cuneo, Italy.

Signed and Sealed this Seventh Day of February 2006.

HASSAN KIZOU
*Supervisory Patent Examiner*
Art Unit 2662